United States Patent
Bauer et al.

(10) Patent No.: US 7,665,062 B1
(45) Date of Patent: Feb. 16, 2010

(54) SYSTEM AND METHODOLOGY FOR DESIGN-TIME DYNAMIC CLASS TYPE CONSTRUCTION

(75) Inventors: Allen Bauer, Scotts Valley, CA (US); John E. Churchill, Monroe, WA (US)

(73) Assignee: Borland Software Corporation, Austin, TX (US)

( * ) Notice: Subject to any disclaimer, the term of this patent is extended or adjusted under 35 U.S.C. 154(b) by 747 days.

(21) Appl. No.: 10/711,148

(22) Filed: Aug. 27, 2004

Related U.S. Application Data

(60) Provisional application No. 60/521,791, filed on Jul. 2, 2004.

(51) Int. Cl.
*G06F 9/44* (2006.01)

(52) U.S. Cl. .................. 717/108; 717/105; 717/109; 717/113; 717/116

(58) Field of Classification Search .................. None
See application file for complete search history.

(56) References Cited

U.S. PATENT DOCUMENTS

| | | | | |
|---|---|---|---|---|
| 5,297,284 | A | 3/1994 | Jones et al. ............... | 717/137 |
| 5,371,891 | A | 12/1994 | Gray et al. ............... | 717/140 |
| 5,410,705 | A | 4/1995 | Jones et al. ............... | 717/168 |
| 5,487,141 | A | 1/1996 | Cain et al. ............... | 715/764 |
| 5,493,680 | A | 2/1996 | Danforth .................. | 717/108 |
| 6,002,867 | A * | 12/1999 | Jazdzewski ............... | 717/105 |
| 6,233,726 | B1 | 5/2001 | Bowman et al. ........... | 717/107 |
| 6,381,734 | B1 | 4/2002 | Golde et al. ............. | 717/165 |
| 6,446,077 | B2 | 9/2002 | Straube et al. ............ | 707/103 |
| 6,467,080 | B1 | 10/2002 | Devine et al. ............ | 717/123 |
| 6,499,041 | B1 | 12/2002 | Breslau et al. ........... | 715/505 |
| 6,542,884 | B1 | 4/2003 | Soderberg et al. ............ | 707/1 |
| 6,606,741 | B2 | 8/2003 | Kojima et al. ............ | 717/109 |
| 6,750,887 | B1 | 6/2004 | Kellerman et al. ......... | 715/788 |
| 6,877,163 | B1 | 4/2005 | Jones et al. ............... | 719/332 |
| 6,898,764 | B2 | 5/2005 | Kemp .................... | 715/762 |
| 6,915,301 | B2 | 7/2005 | Hirsch ................... | 707/102 |
| 6,968,536 | B2 | 11/2005 | Jazdzewski ............... | 717/106 |

OTHER PUBLICATIONS

Lam et al., ".NET Framework Essentials", Jun. 2001, O'Reilly, pp. 1-51.*

(Continued)

*Primary Examiner*—Michael J Yigdall
*Assistant Examiner*—Ben C Wang
(74) *Attorney, Agent, or Firm*—Kokka & Backus, PC

(57) ABSTRACT

A system and methodology for design-time dynamic class type construction is described. In one embodiment, for example, in a form-based development system, a method is described for dynamically constructing a form under an object framework during development of an application by a user, the method comprises steps of: providing an ancestor class under an object framework, the ancestor class for representing a form in the development system; in response to user input, creating a descendant class inheriting from the ancestor class for representing a particular form to be included in the application; generating instructions for creating methods of the descendant class under the object framework; creating a type delegator for the descendant class, thereby enabling the descendant class to track changes made to the particular form during development of the application; creating an instance of the descendant class; and constructing the particular form in the development system based on the instance of the descendant class.

47 Claims, 7 Drawing Sheets

OTHER PUBLICATIONS

Albahari et al., "C# in a Nutshell, 2$^{nd}$ Edition", Aug. 2003, O'Reilly, pp. 1-16.*

Adams et al., ".NET Windows Forms in a Nutshell", Mar. 2003, O'Reilly, pp. 1-34.*

Bob Swart, "Migrating Borland Delphi applications to the Microsoft .NET Framework with Delphi 8", Feb. 2004, Borland Software Corporation, pp. 1-22.*

* cited by examiner

SYSTEM AND METHODOLOGY FOR DESIGN-TIME DYNAMIC CLASS TYPE CONSTRUCTION

CROSS REFERENCE TO RELATED APPLICATIONS

The present application is related to and claims the benefit of priority of the following commonly-owned, provisional application(s): application Ser. No. 60/521,791, filed Jul. 2, 2004, entitled "System and Methodology for Design-Time Dynamic Class Type Construction", of which the present application is a non-provisional application thereof. The disclosure of the foregoing application is hereby incorporated by reference in its entirety, including any appendices or attachments thereof, for all purposes.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

Computer Program Listing Appendix under Sec. 1.52(e): This application includes a transmittal under 37 C.F.R. Sec. 1.52(e) of a Computer Program Listing Appendix. The Appendix, which comprises text file(s) that are IBM®-PC machine and Microsoft® Windows Operating System compatible, includes the below-listed file(s). All of the material disclosed in the Computer Program Listing Appendix can be found at the U.S. Patent and Trademark Office archives and is hereby incorporated by reference into the present application.

BACKGROUND OF INVENTION

1. Field of the Invention

The present invention relates generally to information processing environments and, more particularly, to a system and methodology for design-time dynamic class type construction.

2. Description of the Background Art

Before a digital computer may accomplish a desired task, it must receive an appropriate set of instructions. Executed by the computer's microprocessor, these instructions, collectively referred to as a "computer program", direct the operation of the computer. Expectedly, the computer must understand the instructions which it receives before it may undertake the specified activity.

Owing to their digital nature, computers essentially only understand "machine code", i.e., the low-level, minute instructions for performing specific tasks—the sequence of ones and zeros that are interpreted as specific instructions by the computer's microprocessor. Since machine language or machine code is the only language computers actually understand, all other programming languages represent ways of structuring human language so that humans can get computers to perform specific tasks.

While it is possible for humans to compose meaningful programs in machine code, practically all software development today employs one or more of the available programming languages. The most widely used programming languages are the "high-level" languages, such as C++, Pascal, Java®, and C#®. These languages allow data structures and algorithms to be expressed in a style of writing that is easily read and understood by fellow programmers.

A language "compiler" is a program that takes human authored source code logic and transforms that into mechanical binary logic (machine code instructions) for a given target program. In a typical implementation, a compiler includes operational stages of scanning/parsing the source code, tokenizing the source code, and recognizing symbols and language logic, for purposes of converting the source code into an internal representation. A modern day compiler will iterate over the internal representation to optimize the selection of machine code instructions. Ultimately, the compiler emits a sequence of machine code instructions which comprise the binary logic for the compiled source code. The ultimate output of the compiler is a compiled module such as a compiled C++ "object module", which includes instructions for execution ultimately by a target processor, or a compiled Java class, which includes bytecodes for execution ultimately by a Java virtual machine.

Although an object module includes code for instructing the operation of a computer, the object module itself is not usually in a form which may be directly executed by a computer. This binary logic is typically linked with other compiled modules to produce the ultimate executable program. Linking may be thought of as the general process of combining or linking together one or more compiled object modules or units to create an executable program. This task usually falls to a program called a "linker." After resolving interconnecting references as needed, the linker constructs an executable image by organizing the object code from the modules of the program in a format understood by the operating system program loader. The end result of linking is executable code (typically an .EXE file) which, after testing and quality assurance, is passed to the user with appropriate installation and usage instructions.

Integrated development environments, such as Borland® Delphi™, Borland® JBuilder®, and Borland® C# Builder® (all available from assignee Borland Software Corporation of Scotts Valley, Calif.), are the preferred application development environments for quickly creating production applications. Such environments are characterized by an integrated development environment (IDE) providing a form designer, a property getter/setter manager ("inspector"), a project manager, a tool palette (with objects which the user can drag and drop on forms), an editor, a debugger, and a compiler. In general operation, the user "paints" objects on one or more forms, using the form designer. Attributes and properties of the objects on the forms can be modified using the property manager or inspector. In conjunction with this operation, the user attaches or associates program code with particular objects on the screen (e.g., button object). Typically, code is generated by the IDE in response to user actions in the form designer and the user then manipulates the generated code using the editor. Changes made by the user to code in the editor are reflected in the form designer, and vice versa. After the program code has been developed, the compiler is used to generate object code for execution on a machine.

Today, most software development occurs within the context of a development framework. Microsoft's .NET framework is a new framework that has gained a lot of attention lately. The .NET framework is a collection of classes implemented on top of a Common Language Runtime ("CLR") system providing containers, strings, components, interfaces, streams, and user interface control classes for use by programmers writing applications to run in the .NET execution environment (the .NET platform). The CLR is a program execution architecture which includes rich type information at runtime, an intermediate abstract machine instruction set that is compiled to native machine instructions at runtime, and a variety of system services to automate remote procedure calls over network connections, security checks, and garbage-collected memory management. The core infrastructure of CLR is defined in documents published by the ECMA standards body (Ecma International, a European association for standardizing information and communication systems). Technically, the .NET architecture can be implemented independently of Microsoft, such as illustrated by the Mono project by Novell, Inc. of Waltham, Mass.

With adoption of new development frameworks, such as Microsoft's .NET framework, a problem arises with efficiently migrating existing programs and tools to these new development frameworks. For example, the form designer used in the Borland® Delphi™ IDE running on Microsoft Windows 32-bit operating systems (hereinafter "Win-32") relies on being able to dynamically construct a new form class "on-the-fly". To dynamically construct a new form class, additional metadata is added to a class that describes its layout and structure based on what the compiler saw at compile-time. Things like the class name of the new form class as well as method names, method addresses, field names and field addresses, and the like are encoded into tables that are accessible at run-time. These tables are used by the property-based streaming system to allow persisting of any type of class. By generating these tables "on-the-fly", the layout and structure of a "new" form class can be simulated as it is being constructed by the form designer. The property-based streaming system does not know the difference between the newly built class and a compiler-built class. Thus, when an instance of this new class is constructed it appears, for all intents and purposes, to be an instance of the new class type.

A problem arises however in attempting to use this same approach in conjunction with new development frameworks, such as the Microsoft .NET framework. In order to use Microsoft's .NET framework and the Common Language Runtime (hereinafter, the ".NET framework"), one must follow certain rules set forth by the .NET framework. In this environment it is not feasible to dynamically construct a new class on-the-fly by generating the class metadata as a function of in-memory tables of a certain structure. This approach is not permitted in a managed code environment such as that provided by the .NET framework.

From a user standpoint, however, the user that is developing an application for a new framework (e.g., the .NET framework) wants to be able to use the existing development tools and interfaces in the same manner as in the past. Although other form-based designers are available (e.g., Microsoft WinForm designer), it does not provide the same features or functionality and would require developers already familiar another designer (e.g., the Delphi form designer) to learn a new tool. The ability to use existing tools with which a developer/user is familiar makes it easier to transition to a new framework. However, to provide the familiar development tools and interfaces (e.g., an IDE form designer) on the new framework requires modifications to the underlying infrastructure supporting the operation of these development tools because of the constraints imposed by the new framework (e.g., the .NET framework).

For example, the .NET framework imposes certain constraints which preclude directly accessing raw metadata information, including the metadata which describes the different classes and types in the system. In contrast, in the native Win-32 machine code generated environment, metadata information could be directly generated and manipulated (e.g., in the dynamic creation of forms by an IDE). For instance, in the Win-32 environment, the dynamic generation of forms by the Delphi form designer is implemented based on the ability to control the raw metadata information and perform direct manipulation of that information. Creating and regenerating forms in the form designer in this environment relies on this ability to directly manipulate metadata information. The Microsoft .NET framework environment, however, does not allow this type of direct metadata manipulation as it violates the tenets that the managed execution environment supports. Accordingly, in order to provide users (e.g., application developers) with the same development experience of the familiar form designer of existing development systems (e.g., the Delphi development system), the underlying infrastructure of the development system must be modified in order to provide this functionality in the managed execution environment provided by the .NET framework.

What is needed is a solution that enables a new class type to be dynamically constructed "on-the-fly" at design time on a development framework, such as the .NET framework. The solution should, for instance, be able to persist the state of a form that is being visually designed in a development system without direct generation and manipulating of underlying metadata information. Also, the solution should be implemented in a manner that does not require the existing development environment in which the form designer is implemented to be completely rearchitected. Ideally, the ability to support dynamic generation of forms should be implemented in an isolated way that does not require wholescale modification of the entire development environment. The present invention provides a solution to these and other needs.

SUMMARY OF INVENTION

A system and methodology for design-time dynamic class type construction is described. In one embodiment, for example, in a form-based development system, a method of the present invention is described for dynamically constructing a form under an object framework during development of an application by a user, the method comprises steps of: providing an ancestor class under an object framework, the ancestor class for representing a form in the development system; in response to user input, creating a descendant class inheriting from the ancestor class for representing a particular form to be included in the application; generating instructions for creating methods of the descendant class under the object framework; creating a type delegator for the descendant class, thereby enabling the descendant class to track changes made to the particular form during development of the application; creating an instance of the descendant class; and constructing the particular form in the development system based on the instance of the descendant class.

In another embodiment, for example, a development system of the present invention for dynamically constructing a form responsive to user input under an object framework during development of an application is described that comprises: an ancestor class for representing the form under the object framework; a proxy module for creating a descendant class inheriting from the ancestor class in response to user input, dynamically generating methods of the descendant class, and constructing an instance of the descendant class under the object framework for representing a particular form in the development system; a type delegator for the descendant class for persisting user input on the particular form during development of the application; and a module for displaying the particular form in a user interface of the development system based on the descendant class and the persisted user input.

DETAILED DESCRIPTION OF A PREFERRED EMBODIMENT

Glossary

Figure 1:
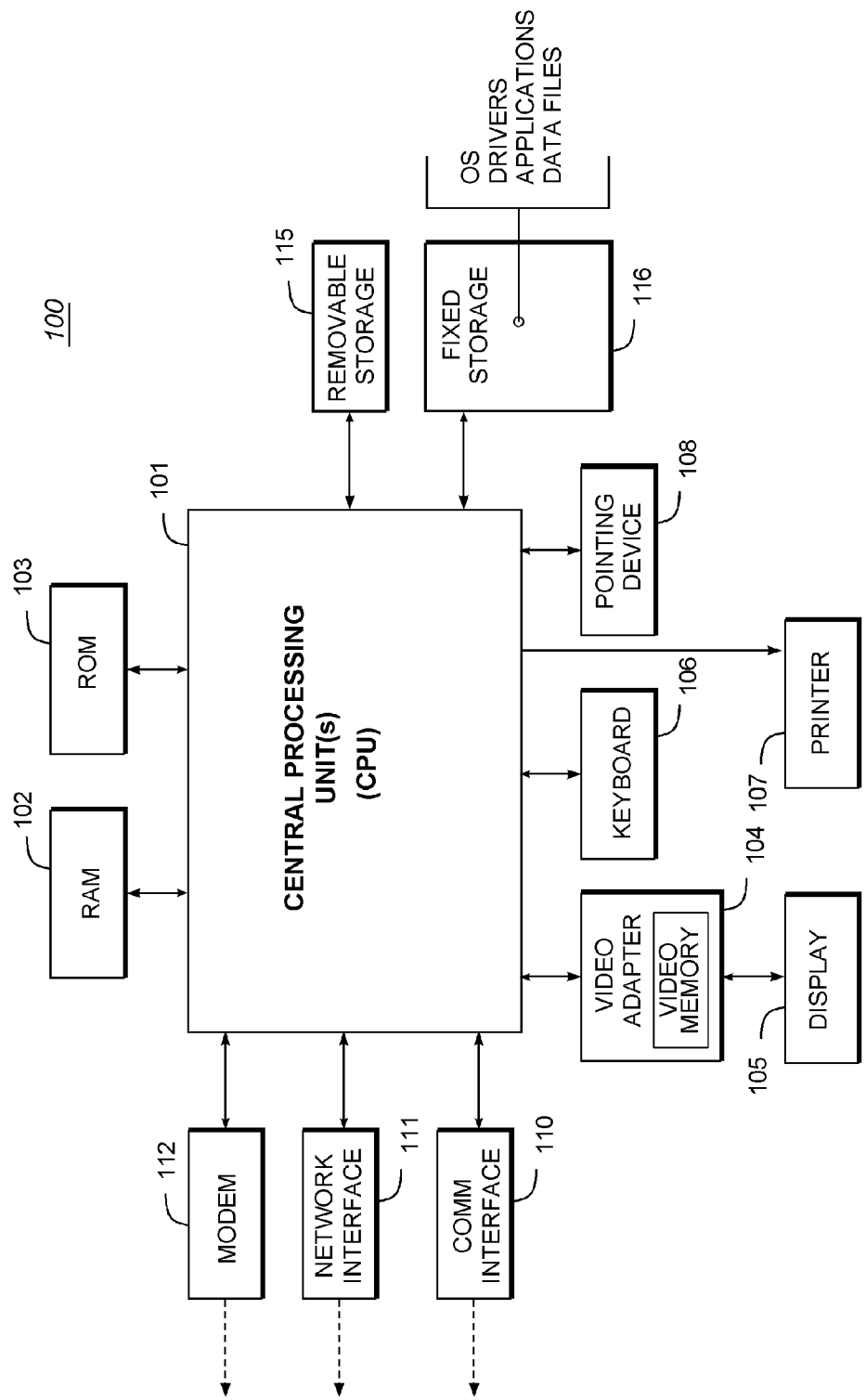
FIG. 1 is a very general block diagram of a computer system (e.g., an IBM-compatible system) in which software-implemented processes of the present invention may be embodied.

The following definitions are offered for purposes of illustration, not limitation, in order to assist with understanding the discussion that follows.

Assembly: An assembly is a primary building block of a .NET framework program. It is a collection of functionality that is built, versioned, and deployed as a single implementation unit containing one or more classes or files. Further description of the creation and use of assemblies is available in the ".NET Framework Developer's Guide" available from Microsoft Corporation of Redmond, Wash. A copy of this documentation is available via the Internet (e.g., currently at msdn.microsoft.com).

Common Language Runtime (CLR): A program execution architecture which includes rich type information at runtime, an intermediate abstract machine instruction set that is compiled to native machine instructions at runtime, and a variety of system services to automate remote procedure calls over network connections, security checks, and garbage-collected memory management.

Compiler: A compiler is a program which translates source code into object code to be executed by a computer. The compiler derives its name from the way it works, looking at the entire piece of source code and collecting and reorganizing the instructions. Thus, a compiler differs from an interpreter which analyzes and executes each line of code in succession, without looking at the entire program. A "Java compiler" translates source code written in the Java programming language into bytecode for the Java virtual machine.

Linker: A program that combines object code modules to form an executable program, including replacing symbolic addresses with real addresses.

Microsoft® .NET: A Microsoft platform that incorporates applications and a suite of tools and services.

Microsoft® .NET Framework: A collection of classes implemented on top of a CLR system providing containers, strings, components, interfaces, streams, and user interface control classes for use by programmers writing applications to run in the .NET execution environment (the .NET platform). Further description of the .NET Framework is available in the ".NET Framework Developer's Guide" available from Microsoft Corporation of Redmond, Wash., the disclosure of which is hereby incorporated by reference. A copy of this documentation is available via the Internet (e.g., currently at msdn.microsoft.com).

INTRODUCTION

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows® operating system. The present invention, however, is not limited to any one particular application or any particular environment. Instead, those skilled in the art will find that the system and methods of the present invention may be advantageously embodied on a variety of different platforms, including Macintosh®, Linux®, Solaris™, UNIX®, FreeBSD®, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Computer-Based Implementation

Basic System Hardware (e.g., for Desktop and Server Computers)

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium® family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP Laserjet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

Basic System Software

Figure 2:
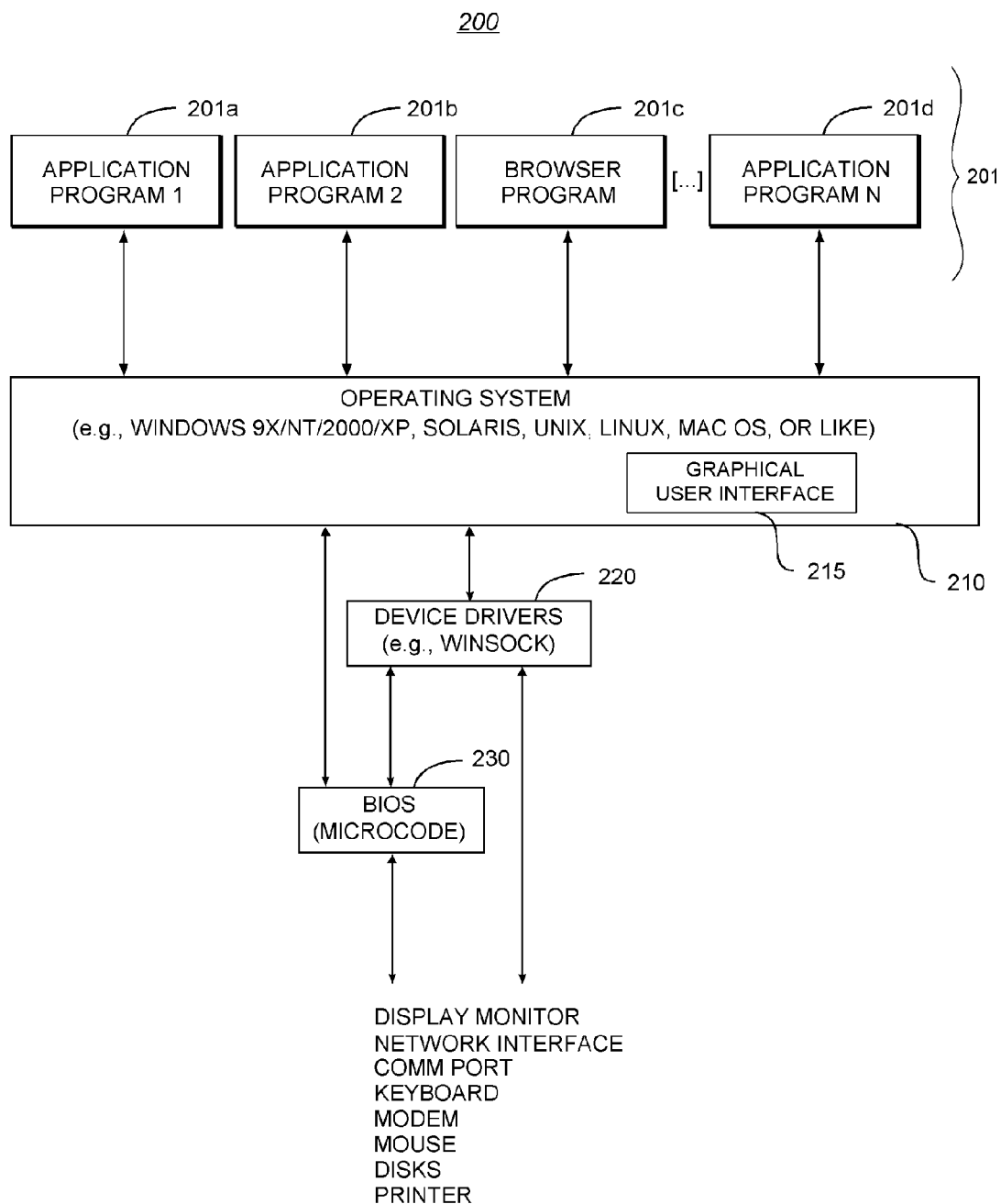
FIG. 2 is a block diagram of a software system for controlling the operation of the computer system.

FIG. 2 is a block diagram of a software system for controlling the operation of the computer system 100. As shown, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201*a*, 201*b*, 201*c*, 201*d*) may be "loaded" (i.e., transferred from fixed storage 116 into memory 102) for execution by the system 100. The applications or other software intended for use on the computer system 100 may also be stored as a set of downloadable processor-executable instructions, for example, for downloading and installation from an Internet location (e.g., Web server).

Software system 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft® Windows 9x, Microsoft® Windows NT, Microsoft® Windows 2000, or Microsoft® Windows XP, all available from Microsoft Corporation of Redmond, Wash. Alternatively, OS 210 can also be an alternative operating system, such as the previously mentioned operating systems.

The above-described computer hardware and software are presented for purposes of illustrating the basic underlying desktop and server computer components that may be employed for implementing the present invention. For purposes of discussion, the following description will present examples in which of at least one computer running programs designed to run on the .NET platform. The present invention, however, is not limited to any particular environment or device configuration. In particular, the .NET platform is not necessary to the invention, but is used to provide a framework for discussion. Instead, the present invention may be implemented in any type of system architecture or processing environment capable of supporting the methodologies of the present invention presented in detail below.

Base Development System

Figure 3:
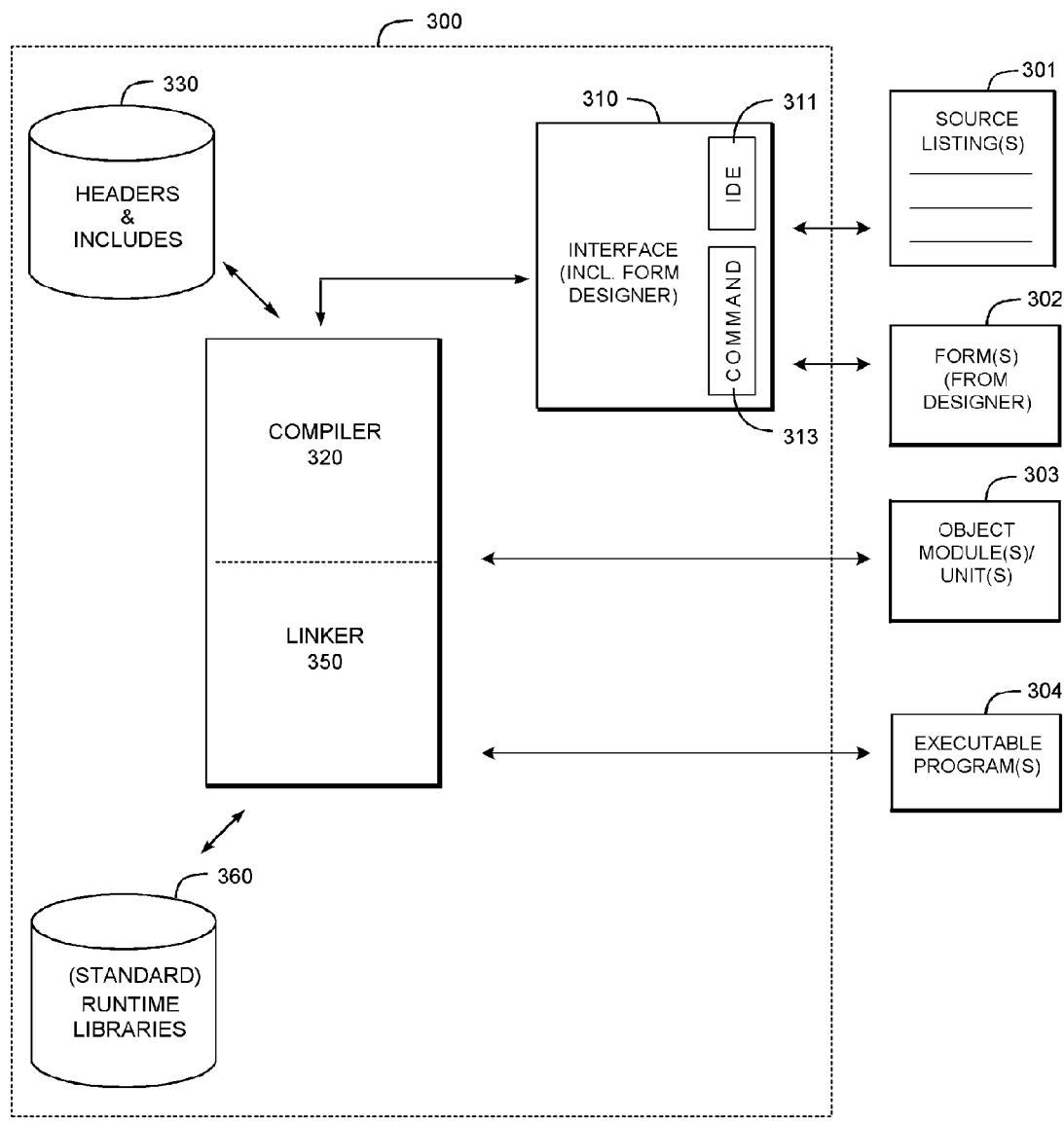
FIG. 3 is a block diagram of a visual development system of the present invention which includes a compiler, a linker, and an interface.

Shown in detail in FIG. 3, a visual development system 300 of the present invention, hosted by software system 200, includes a compiler 320, a linker 350, and an interface 310. Through the interface 310, a developer user "paints" forms 302 with objects and supplies source listings 301 to the compiler 320. The interface 310 includes both command-line driven 313 and Integrated Development Environment (IDE) 311 interfaces, the former accepting user commands through command-line parameters, the latter providing menuing equivalents thereof. From the source code or listings 301, forms 302, and headers/includes files 330, the compiler 320 "compiles" or generates object code module(s) or compiled "units" 303. In turn, linker 350 "links" or combines the units 303 with runtime libraries 360 (e.g., standard runtime library functions) to generate executable program(s) 304, which may be executed by a target processor (e.g., the processor of FIG. 1). The runtime libraries 360 include previously-compiled standard routines, such as graphics, I/O routines, startup code, math libraries and the like. A description of the general operation of development system 300 is provided in the manuals accompanying Borland Delphi™ version 8, available from Borland Software Corporation of Scotts Valley, Calif. A copy of this document is available via the Internet (e.g., currently at www.borland.com/products/downloads/download-delphi.html#).

General operation (i.e., "compilation") by a compiler, such as compiler 320, comprises two main components: a front end and a back end. The "front end" of the compiler parses the source program and builds a parse tree—a well known tree data structure representing parsed source code. The "back end" traverses the tree and generates code (if necessary) for each node of the tree, in a post-order fashion. For an introduction to the general construction and operation of compilers, see Fischer et al., "Crafting a Compiler with C", Benjamin/Cummings Publishing Company, Inc., 1991, the disclosure of which is hereby incorporated by reference for purposes of illustrating the state of the art. Additional description of a development system suitable for implementation of the present invention is available in the trade and patent literature. For example, the Delphi development system is described in commonly-owned U.S. Pat. Nos. 5,995,756, 6,002,867, 6,151,602, 6,185,728, and 6,002,867. The disclosures of each of the foregoing patents are hereby incorporated by reference for purposes of illustrating the state of the art.

The above-described computer hardware and software are presented for purposes of illustrating the basic underlying desktop and server computer components that may be employed for implementing the development environment of the present invention and deploying applications created therefrom. Although the present invention will typically be implemented in a client/server environment, the present invention is perfectly suited for implementation on a stand-alone computing device. Further, the discussion which follows focuses on the currently preferred embodiment which employs the Borland Delphi development system and the Microsoft .NET framework as the development system and framework for implementation of the present invention. However, the invention is not tied to any particular framework and is well-suited for use with a variety of different object oriented frameworks. More particularly, the present invention may be implemented in any type of system architecture or processing environment capable of supporting the methodologies of the present invention presented in detail below. Additionally, some examples have been illustrated using the Delphi syntax. However, those skilled in the art will appreciate that the present invention may similarly be implemented in other programming languages (e.g., Java, C++, C#, or the like). The following description will focus on those features of the development system 300 which are helpful for understanding methods of the present invention for facilitating migration to new object frameworks.

Overview of Design-Time Dynamic Class Type Construction

Before describing the dynamic creation of forms by the system and methodology of the present invention, the operations used to generate forms in the Borland Delphi visual designer (form designer) for the Win-32 platform will be described. In versions of the Delphi development environment for Win-32 platforms, when a user (e.g., application developer) is designing a form using the system's form designer, what in effect happens is that behind the scenes a brand new class type is being created on-the-fly. The system cannot necessarily use the development system's compiler to build this new class type dynamically. Recall that although this is at "design time" for the user (e.g., developer) using the IDE to create an application, from the standpoint of the development environment itself it is essentially at runtime (i.e., the development environment itself is actually running as the user develops an application using it). Accordingly, there is a designer subsystem which actually constructs on-the-fly what looks to the rest of the system like a brand new class type by directly generating and manipulating metadata information.

In general terms, the way this is done on Win-32 is that the designer subsystem actually takes the raw class structure information that the compiler had generated from the "ancestor" type (e.g., a base TForm type) and copies that information internally to a new block of memory. After copying the information, the system then modifies portions of this metadata. The modifications include, for example, the class name. In addition, the designer subsystem actually overrides and changes the addresses of certain other items of information, so that to the rest of the system it appears like it actually is a new class type, when, in fact, at this point it is what is called a "proxy" class. The proxy class is a proxy for representing a new form that the user is creating using the development system's form designer. As the user is designing a form in the form designer, the system builds this proxy class in such a way that when the compiler actually goes through and compiles the application source code, it will match exactly what was in memory before. In other words, the system does not really "see" the difference at that point. However, the above approach of generating and manipulating raw metadata information may not be possible if the development system is implemented on a new framework. For example, the above approach for dynamically generating forms is not possible in a .NET environment. The .NET framework does not permit one to take the raw metadata structures, copy them around in memory, and then expect the system to recognize them. Accordingly, given the constraints of the .NET environment a different way must be found to enable the IDE's form designer to generate the familiar forms.

The present invention, in its currently preferred embodiment, is implemented as part of the Borland Delphi development system for the .NET platform. As it is not possible to directly generate and manipulate metadata information in .NET, the approach of the present invention is to instead use a number of the metadata APIs that are available within .NET itself to construct the metadata through those APIs. For example, the system actually uses these APIs to indicate that a new class type is needed. These APIs are also used to generate intermediate language (or "IL") constructions into the new class type that the execution environment will be able to execute. The present invention provides for actually generating methods on the new class at design time on-the-fly. Another "type descriptor" class is then constructed that provides a sort of proxy "hook" that is used by the system of the present invention as hereinafter described. A number of the low level functions and the low-level support that are needed to dynamically generate new class types on-the-fly are currently available in .NET. The system of the present invention is able to take those functions and assemble them and call them in such a way that enables the system to dynamically construct a new class type on-the-fly when needed.

As with the version of the development system for the Win-32 execution environment, in the user interface of the form designer and to the rest of the execution environment (e.g., the .NET execution environment in this case), the newly generated class type appears to be a "real" class that is live. In fact, on the .NET execution environment the newly-generated class type is actually much more "live" than the corresponding Win-32 version. While the new class is still referred to below as a "proxy", for all intents and purposes it is actually a new class to the execution environment. It should be noted, however, that this new class only exists while the developer is designing/developing an application. In other words, the class is dynamically constructed on-the-fly (e.g., in response to user input in the form designer). As soon as the developer is done designing it, the system persists what the user has done. After the information has been persisted, the new class itself is then essentially thrown away as it is no longer needed. Whenever the development system actually compiles the application source code, the "real" class is actually constructed at that point.

From a user standpoint, the present invention enables the user to see (and use) the exact same form designer interface that he or she is familiar with. The developer/user sees a visual design surface (i.e., a form), which may be blank or which may already include items (e.g., components, etc.) if he or she opens an existing (previously designed) form. The components represent visual design elements that the user/developer normally interacts with during the process of developing applications using the IDE. Examples of these components include edit controls, buttons, labels, and the like. To the user the design surface appears to be the same on Win-32 and on .NET. The developer does not "see" or need to be aware of the fact that behind the scenes the creation of forms using the visual design surface is different on different platforms.

The system of the present invention actually constructs a "proxy" class on-the-fly. This proxy class is modified and changed based on the user's input as the user develops an application in the IDE. To the user it appears on screen like he or she is adding fields to the class, adding new methods to the class, and so forth. The fields represent the different components that the developer places on the form (i.e., the visual design surface). The methods include the different event handlers that will, when the application being developed is completed, respond to various actions of the application end user (e.g., code that is invoked in response to button clicks and the like by the application end user). At design time, the developer/user actually "sees" source code being generated and modified. Behind the scenes the "proxy" class is also being modified in a corresponding fashion to make those modifications visible in the user interface of the IDE. These items have to be visible to the persistence mechanism so that the input by the user (application developer) may be persisted. The persistence mechanism takes and writes this information into a persisting format that can be read and reconstructed at runtime. The components and operations of the system will now be described in more detail.

System Components

Figure 4:
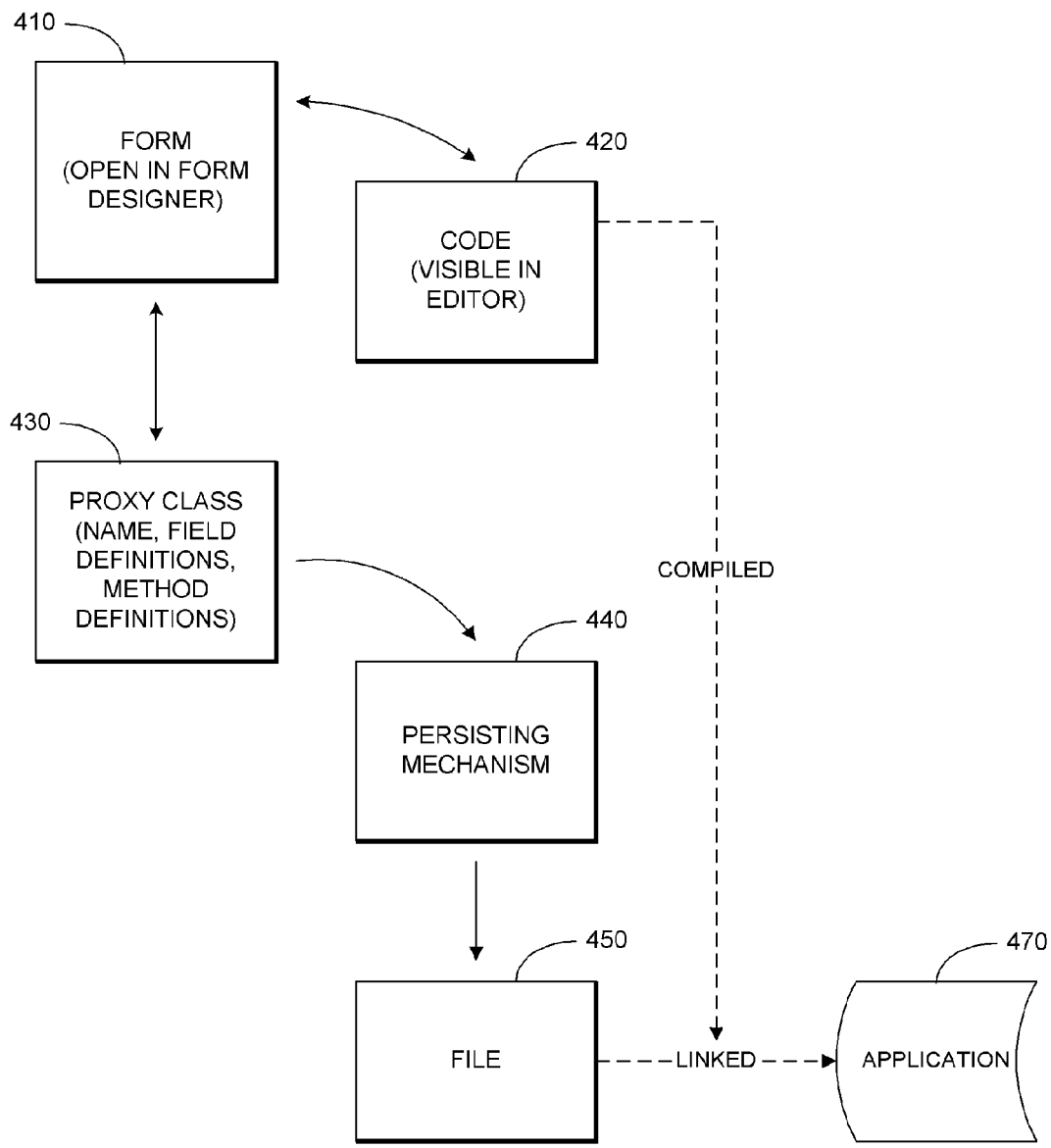
FIG. 4 is a block diagram illustrating the dynamic creation of a class at design-time in a development environment.

FIG. 4 is a block diagram illustrating the dynamic creation of a class at design-time in a development environment. As shown, a form 410 is open on the visual design surface of the IDE's form designer and is visible to the user. The source code 420 is the code for the application module that is being developed, which may include code that is being generated based on user input on the form 410. The source code 420 may include class declarations and the like that are generated based on the form. The form 410 and source code 420 represent aspects that are visible to a user (e.g., application developer) in the user interface of the IDE.

Behind the scenes the form is actually being dealt with internally by the development system as a proxy class 430. The proxy class 430 maintains things like the class name (which visually matches the form name that the user is designing), the field definitions, the method definitions, and so forth. The proxy class 430 is included as part of an assembly (not separately shown at FIG. 4), which is handed off as sort of a root component or root designer to the persisting mechanism 440. The persisting mechanism 440 persists the proxy class 430 based on certain properties of the proxy class and certain other components. The proxy class 430 exists as a container which may contain a number of components. The persisting mechanism 440 causes the proxy class 430 to iterate through its container recursively (as components may contain other components) and creates references to those components that are streamed out to the file 450. The proxy class 430 is the broad data structure that is used for both representing the form visually (e.g., in the form designer and code editor of the IDE) and also to the persisting system (and its streaming subsystem) which actually persist the form. As shown, the persisting mechanism 440 saves out the proxy class as a file 450 to persist the user's input on the form 410 open in the form designer.

Before the application executes at runtime, the source code 420 that is developed using the development system is compiled. The file 450 that was generated also gets linked in during the process of creating the executable application 470. Essentially, the components that were developed get put together at that point. When the class is constructed at runtime, the class knows that it has a persistence store behind it which describes all the components placed onto the form and how these components "wire up" with methods of the class and the like. The system knows to locate and collect the related pieces and then stream them back in and reconstruct them at runtime to generate the appearance and behavior implemented by the developer at design time.

The core design-time dynamic class type construction functionality of the present invention is currently implemented in a single module (file). Functions and procedures of this module are described below in greater detail. Some other modules play a supporting role. There is one internal class which is the proxy type itself, which is actually a descendant of a regular .NET type which is referred to herein as the "type delegator". The type delegator allows one to intercept (or "get in the way") of the normal metadata API calls so that metadata can be manipulated to create class types on-the-fly. In effect, the proxies that are created intercept and use several metadata API calls. To the metadata APIs, the proxies are calling through type delegators and mechanisms that have constructed these new types on the fly as is they were the "real" types. The proxies make the calls into the metadata information and access the metadata information as if they were "real" types. However, for implementation on the .NET framework they have to do it indirectly through the APIs that are presented by .NET.

The present invention may be considered as constructing a type of "shim" or "wedge" that is placed into several different locations. This shim or wedge allows the system to observe certain metadata API calls as they are being made and make the appropriate redirections as needed (or vector them to the right types that are applicable). The system of the present invention actually constructs a new assembly internally in memory on-the-fly. The assembly contains a module, which in turn contains a type which is a class. This class is the proxy type which is constructed as described below in greater detail.

The methodology of the present invention also provides for overriding certain methods as the proxy class is being generated. As the proxy class is created the system generates intermediate language (IL) code that allows "hooking" the overridden methods. These operations are described below in greater detail.

DETAILED OPERATION

The following description presents method steps that may be implemented using processor-executable instructions, for directing operation of a device under processor control. The processor-executable instructions may be stored on a computer-readable medium, such as CD, DVD, flash memory, or the like. The processor-executable instructions may also be stored as a set of downloadable processor-executable instructions, for example, for downloading and installation from an Internet location (e.g., Web server).

Creating Form on Visual Design Surface

Figure 5A:
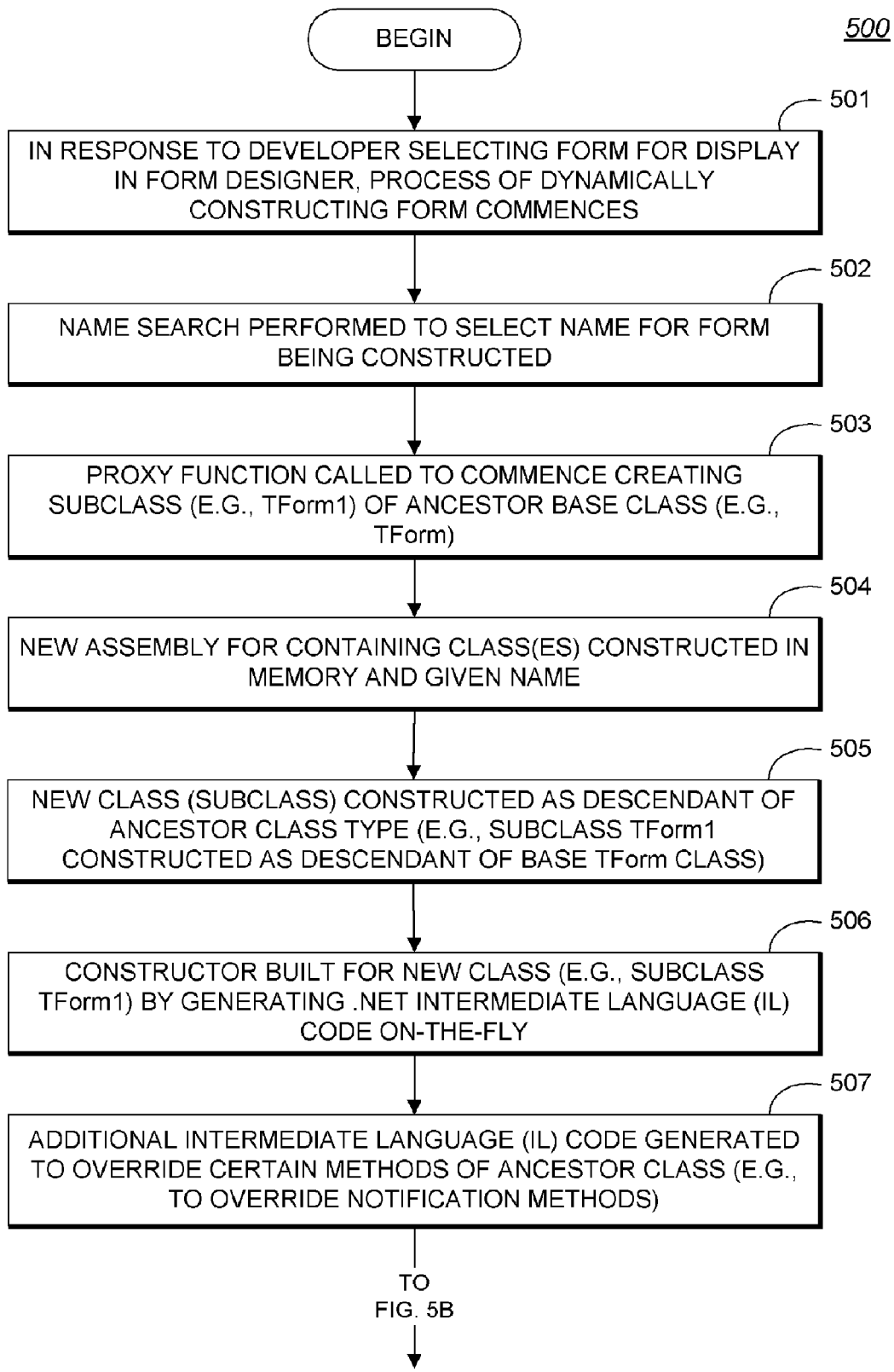
FIGS. 5A-B comprise a single flowchart illustrating the high-level steps involved in creating a new form in response to the user selecting a form in the user interface of the development system.
Figure 5B:
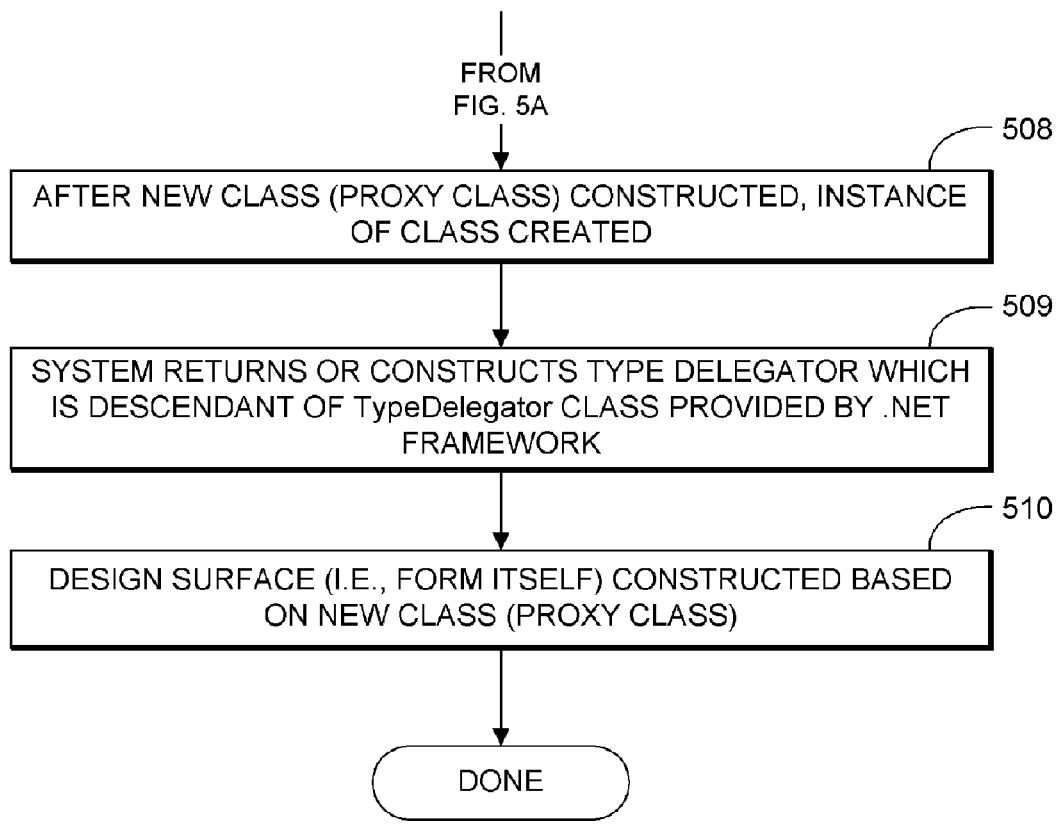

FIGS. 5A-B comprise a single flowchart 500 illustrating the high-level steps involved in creating a new form in response to the user selecting a form in the user interface of the form designer. The following discussion uses an example the steps taken behind the scenes by the system of the present invention in constructing a new form. These steps illustrate the construction of a new form for display on the visual design surface in response to a user selecting a form in the development system's form designer in conjunction with the development of an application. Although this discussion refers to construction of a new form (i.e., starting from a form not previously designed by the user), it should be noted that the user could also select a form that was already fully or partially built and similar steps would occur in reconstructing the form. Accordingly, the following example is for purposes of illustration and not limitation.

At step 501, a developer that is developing an application using an IDE in which the present invention is embodied selects a form for display in the form designer. In response, the system of the present invention commences the process of dynamically constructing the form. At step 502, the system performs a name search to determine what the name of the form should be. During the process of constructing the form the IDE itself determines the name of the form and selects a name that is not already in use. For instance, a name such as "TForm1" may be selected for the new form. Before presenting a design surface to the developer/user, the underlying "proxy" class which supports the form must be constructed. At this point, the system knows that the developer/user wants to create a form that is a descendant of a TForm class. The TForm class is a stock (or base) class which is implemented under the VCL for .NET framework. VCL refers to the Visual Component Library which is a framework implemented on top of the CLR (Common Language Runtime) and the .NET framework and supported in the currently preferred embodiment of the present invention. Several of the classes and components referenced herein, such as TForm, are provided as part of the VCL for .NET framework.

At step 503, a proxy function is called to create a subclass of the TForm class. The TForm class is referred to as the "ancestor" of the subclass that is being created. The subclass is referred to as a "descendant" of the TForm class. In the case of a Win-32 implementation, the creation of a form would then involve locating the metadata block of memory that the compiler generated for the ancestor form (i.e., TForm), copying that metadata to a new block of memory, and then manipulating the copied metadata (e.g., modifying a few pointers/locations), such that the new block of metadata now appeared to be a new class type. However, this is not permissible in the case of a .NET implementation, so the process of dynamically constructing the form proceeds as described below.

At step 504, a new assembly is constructed in memory and it is given a new name. In the currently preferred embodiment, some sort of "proxy" name is used for the new assembly. An assembly is a primary building block of a .NET framework program. It is a collection of functionality that is built, versioned, and deployed as a single implementation unit containing one or more classes or files. There are a number of .NET APIs that can be used for actually constructing this assembly. Further description of the creation and use of assemblies is available in the ".NET Framework Developer's Guide" available from Microsoft Corporation of Redmond, Wash. A copy of this documentation is available via the Internet (e.g., currently at msdn.microsoft.com).

At step 505, a class (i.e., subclass) is constructed which is a descendant of a class of the type that is being constructed (i.e., an ancestor class). In this example, the class that is constructed is a descendant of the TForm class. Although a new class (subclass) is being created at this point, it should be noted that this is done using the actual emit metadata APIs and the like provided by the .NET framework. For example, System.Reflection.Emit namespace of the .NET framework contains classes that allow a compiler or tool to emit metadata and Microsoft intermediate language (MSIL) and optionally generate a PE file on disk. Further description of the System.Reflection.Emit namespace is provided in the above-referenced ".NET Framework Developer's Guide". As part of this construction process, the new class (subclass) is told what its ancestor is (i.e, TForm).

The new class must also be given a constructor because the .NET framework rules provide that all classes must have a constructor. At step 506, a constructor is built for the new class (subclass). It should be noted that this diverges significantly from the prior Win-32 approach because at this point as the constructor that is created actually includes "real" code. In creating the constructor, actual .NET intermediate language (IL) code is generated on-the-fly. Typically, the constructor may contain nothing more than a callback to its ancestor's constructor, but a constructor is created as it is a requirement for the class to have a constructor. After the constructor is created, at step 507 additional IL code is generated to override certain methods of the ancestor class (i.e., to override methods of the TForm class). The methods that are overridden include notification methods of the ancestor class. For implementation of the present invention, the system needs to know when components are added to (and deleted from) the form and so forth. When a developer/user drops a component (e.g., a button object) onto a form (i.e., visual design surface), in a number of cases that component during its construction may actually construct other components. Accordingly, the present invention has to be able to track the creation, renaming, and deletion of components. To do so, the notification methods of the ancestor class are "hooked" by generating a new method (using IL code) that is an override of the ancestor's notification method. The method that is generated is a virtual override of the base (ancestor) class.

After the "proxy" class has been constructed, at step 508 an instance of the class is created. Note that this is different than in the Win-32 environment which generally starts with an existing instance, constructs the class instance, and then changes its type on-the-fly. In the .NET environment, the type cannot actually be changed on-the-fly (i.e., dynamically). As a result, the methodology of the present invention provides for actually constructing the class, including the type information, prior to the creation of an instance of the class. At step 509, the system returns or constructs a type delegator which is a descendant of a TypeDelegator class provided by the .NET framework. The TypeDelegator class can be used to wrap a Type object and delegate all methods to that Type. Delegates are used for managed code objects to encapsulate method calls. They are used primarily in Event notifications and callbacks. Further description of the .NET TypeDelegator class is available in the above-described ".NET Framework Developer's Guide". The type delegator allows for enumerating through the fields, methods, properties, and events of the class, and "hooking" that information. At this point, a type delegator and a class instance have been created.

At step 510 the design surface (i.e., the form itself) is constructed based on the proxy class that has been created. The form then runs and is visible to the user (e.g., developer) in the interface of the development system. To the user it appears that the form has been actually constructed. To the execution environment and to the actual streaming system, however, it appears as a new class of type TForm1 (e.g., a new class derived from TForm). Although the new class is a "proxy", for all intents and purposes it is a new instance of a new type that has now been constructed to represent the form. The class that is constructed is referred to as a proxy as it behaves to some extent as a proxy. However, because of the requirements of the .NET environment, the methodology of the present invention provides for actually constructing the new type.

It should be noted that the proxy class that is created above will change as the user interacts with the form in designing an application. For example, new fields may suddenly appear and the system of the present invention has to be able to add, or to appear to add, these new fields to the class (i.e., to the TForm1 class using this same example), without actually having to destroy or create a new class each time. Once the class is created, it is essentially done. Accordingly, the type delegator provides the functionality which is more similar to the traditional proxy. Rather than trying to modify the actual metadata that has been emitted in creating the class, the type delegator facilitates creating tables and other information that is used to track changes to the form as the user is designing the form. The operations of the system in response to user input in designing the form are described below.

Receiving User Input for Designing Form

Figure 6:
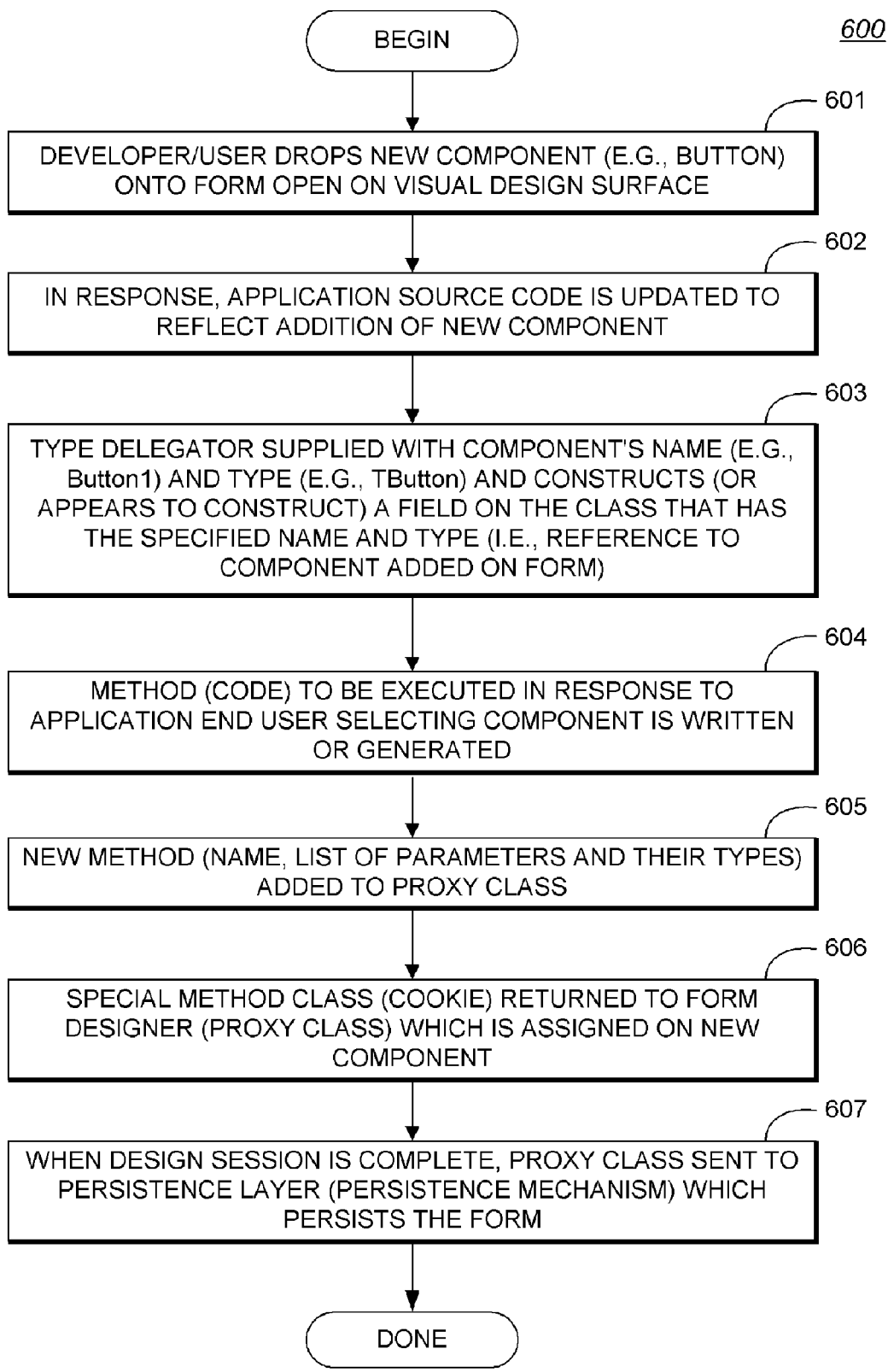
FIG. 6 is a flowchart illustrating the operations of the system of the present invention in response to user input for designing a form.

FIG. 6 is a flowchart 600 illustrating the operations of the system of the present invention in response to developer/user input for designing a form. After a form has been created as described above, a user may interact with the form. For instance, a user may drop a new component onto the form visible in the interface of the IDE during development of an application. The system of the present invention has to create what appears (to the user) to be a new field on the form that holds the reference to the instance of that component.

At step 601, the process commences when a developer/user drops a new component onto a form open on the visual design surface of the IDE. For example, a user may drop a button component onto the form that was previously created as described above. In response to the act of dropping the component onto the form, at step 602 the application source code is updated to reflect the addition of the new component.

At step 603, the type delegator (or proxy) is informed that a component was dropped onto the form and is supplied with the component's name and its type. The type delegator (proxy) then constructs (or appears to construct) a field on the class that has the specified name (physical name) and type. For example, if the component dropped onto the form is a button, it might end up with a name "Button1" and a type of "TButton". Subsequently, if one went back and actually queried the proxy class for a list of fields it will have "Button1" of type "TButton". In other words, a reference to that component is added to the form. It should be noted that the component is added to the application code itself (e.g., code that is visible in the editor of the IDE), which is the code that the user will actually be interacting with. At this point there is just a field in the code that represents the button (Button1) on the form.

At step 604, the developer/user writes (or has the system generate) the method (code) that will be executed in response to an application end user selecting (e.g., clicking on) the component (e.g., the button) when the application is running. The user typically activates the component and writes code or instructs the development system to generate the method (e.g., by double clicking on the button or going to the object in the object inspector of the IDE and selecting the event handler for the event that is to be handled). At step 605, a new method is then added to the proxy class. This involves a similar process to that described above in adding a new field to the class. The new method added to the class has a name and a list of parameters and their types. In the case of a button click, for example, "Button1Click" may be the name of the method. This Button1 Click method may be a procedure (which means that it does not have a function result type as it does not return anything), and have a single parameter which is a reference to the button itself (i.e., Button1 which sends the event). An object is added into the proxy with all of the appropriate metadata information that is needed by the persisting system to enable the persisting system to "wire up" the method (e.g., Button1 Click) and the corresponding component (e.g., Button1) at runtime.

At step 606, a special method class is returned to the form designer (proxy class) which is then assigned on the component (e.g., Button1). This is essentially a small "cookie" that represents the method (e.g., the Button1 Click method). It is not really an actual method at this point, but the system assigns it because it is assignment compatible at this point. By passing the "cookie" to the button, the streaming system thinks it has a method assigned on the button. The streaming system is able to take this "cookie" that is pointing to the method (e.g., "Button1 Click") and use it for constructing the method when needed. Whenever the information is written out, the streaming system can write a reference to the method. It should be noted that the cookie can be passed around and the same cookie can be assigned to another button. It is not necessary to recreate a new version of the method. Generally, this cookie is retained until the method (e.g., Button1 Click) is actually deleted so that this particular method does not have to be reconstructed. The same process occurs for each method that is generated.

When the developer/user is done dropping components on the form and adding associated methods, the user may terminate the design session. At step 607, when the design session is complete the proxy class is sent to the persistence layer which persists the form. The persistence layer (persistence mechanism) actually iterates through the components based on the live instances that it sees on the design surface. The process of persisting the form is described below.

Generally, the process of persisting the form commences with the "root designer" or "root component", which is the root container of the system. The system typically has containers of containers, and at the root there is one root container that represents where things start. The root may be the base form, although other cases which do not involve forms operate in essentially the same manner. The persistence mechanism takes the root component and hands it off to the streaming system which then, using all of the metadata it finds, is able to go through and obtain all the properties for that component and then persist the property values out (e.g., write them out to a file). These values are written out in a particular format. Next, the persisting mechanism goes through and finds that the component contains or "owns" certain other components. It goes through the components that it owns and basically calls back through again in a recursive fashion. The persisting mechanism goes through the properties of these components and streams them out (e.g., writes them to a file). It is at the root that the proxy actually comes in to play so that the streaming system knows that it needs to persist out a reference to a method (based on looking at a cookie). By obtaining the above-described cookie, the streaming system is able to actually add a reference to the method (e.g., Button1 Click) in the actual persisted format. After all of the components have been written out, the form is closed off and persisted.

Visual Inheritance

In addition to providing for proxy classes that inherit from classes provided by the .NET framework, the present invention also supports a visual inheritance model. This visual inheritance model enables a developer to create descendants of forms that have already been designed. For example, a developer can create a TForm2 that is a descendant of a previously created TForm1. The descendant TForm2 will inherit the properties, components, and the like of its ancestor (i.e., TForm1). In this case, TForm2 would already include, when initially constructed, the Button1 component that was placed onto TForm1 as described above. The developer can then manipulate that button on the new form (TForm2) so as to make it different than its ancestor. It should be noted that this button cannot really be deleted on the new form (TForm2) as it exists in the ancestor. However, the developer can move it around, change its size, change its properties, hook a different method to it, and so forth. This basic visual inheritance methodology was first described in commonly owned U.S. Pat. No. 6,002,867 titled "Development System with Methods Providing Visual Form Inheritance". In accordance with the present invention, the technique is extended to support the design-time dynamic class type construction described herein. In order to support visual form inheritance, the proxy system provided by the present invention supports the creation of proxies of proxies.

The system of the present invention was generalized and constructed so that a proxy class that is constructed can (if necessary) be passed back through the system to create a new class that inherits from the first proxy class. The new class in this case is a subclass that inherits from an existing proxy class. This may include constructing proxies of proxies to N levels deep. To ensure that this visual inheritance functionality continues to be supported, the system of the present invention provides for constructing proxies of proxies without directly copying and manipulating metadata information. At a high-level, this is achieved by maintaining a layer between the metadata and the accessors that are manipulating metadata information. This layer also handles the translation so that the metadata is translated into the correct format.

Proxy Creation and Manipulation Routines

The following discussion describes certain of the core proxy class creation and manipulation routines in greater detail. As previously mentioned, the core functionality of the present invention is currently implemented in a single module (file). Other routines call into this module which performs the bulk of the work in creating a proxy class. The following is the class interface that represents how the functionality is presented to other modules of the system:

```
 (1) 14: interface
 (2) 15:
 (3) 16: uses
 (4) 17:   System.Collections, System.Reflection,
             System.Reflection.Emit,
 (5) 18:   System.Globalization, TypInfo, Classes, SysUtils;
 (6) 19:
 (7) 20:
 (8) 21: //!! APIs have changed quite a bit
 (9) 22: function CreateSubClass(AAncestor: TClass; const
             AClassName:
(10) string;
(11) 23:   const AUnitName: string = ''): TClass;
(12) 24: procedure DestroySubClass(AInstance: TObject); overload;
(13) deprecated;
(14) 25: procedure DestroySubClass(AClass: TClass); overload;
(15) 26: procedure RenameSubClass(AInstance: TObject; const
             AClassName:
(16) string;
(17) 27:   const AUnitName: string = ''); overload; deprecated;
(18) 28: procedure RenameSubClass(AClass: TClass; const
             AClassName: string;
(19) 29:   const AUnitName: string = ''); overload;
(20) 30:
(21) 31: // TODO: ConstructSubClass - this should not be needed!
(22) 32: function ConstructSubClass(AClass: TClass; AParams: array of
(23) TObject): TObject;
(24) 33: // TODO: ConstructComponent - this should not be needed!
(25) 34: function ConstructComponent(AClass: TComponentClass;
             AOwner:
(26) TComponent = nil): TComponent;
(27) 35:
(28) 36: function IsProxyClass(AInstance: TObject): Boolean; overload;
(29) 37: function IsProxyClass(AClass: TClass): Boolean; overload;
(30) 38:
(31) 39: // TODO: ChangeToProxyClass, this can't work like the
             old way
(32) so will this do?
(33) 40: procedure ChangeToProxyClass(AInstance: TObject{; TClass
(34) argument}); overload; deprecated;
(35) 41: procedure ChangeToProxyClass(AClass: TClass); overload;
(36) 42:
(37) 43: function CreateSubClassMethod(AInstance: TObject;
(38) 44:   const AMethodName: string): TMethodCode;
(39) 45: procedure RenameSubClassMethod(AInstance: TObject;
(40) 46:   const AMethodCode: TMethodCode; const AMethodName:
             string);
(41) 47: procedure DestroySubClassMethod(AInstance: TObject;
(42) 48:   const AMethodCode: TMethodCode);
(43) 49:
(44) 50: procedure HandleNotification(Sender: TObject; Acomponent:
(45) TComponent; Operation: TOperation);
(46) 51:
(47) 52: procedure SaveIt;
(48) 53:
(49) 54: type
(50) 55:   EProxyError = class(Exception);
(51) 56:
```

As shown above, the interface includes a flat set of functions and procedures. Of particular interest, at line 22, is a CreateSubclass function which is the entry point to the core routines of the class. The CreateSubclass function receives an ancestor class as an input parameter. Note that this ancestor class is an actual class (e.g., the TForm class implemented under the .NET framework) and not an instance because the proxy class must be constructed before an instance of the class is created. As shown above at line 22, AAncestor is the parameter that refers to the ancestor class. AClassName is the desired class name for the new class. There is also an optional parameter for representing the unit name (e.g., Unit 1), which is used in most cases for representing the name of the source file (module) that the developer/user is designing. The CreateSubclass function returns the new class type which is a proxy class.

To construct the proxy class requires that it be dynamically constructed. A "CreateDesignComponent" function (not shown above) is initially called. Because of some differences in the way these calls can be made in .NET (as compared to Win-32), the actual constructor must be dynamically invoked, which requires looking up the metadata, finding the constructor, constructing the list of parameters to it, and then calling an "invoke" on it which invokes the actual construct. The call to CreateDesignComponent is necessary because in the .NET environment the act of constructing allocates the object and actually calls the constructor. Currently, there is no way to create a new instance without calling the constructor. Accordingly, the CreateDesignComponent routine is called to set up some global values that are needed during construction of the proxy class. The CreateDesignComponent function that is called is not specific to the creation of a proxy class. It is a function that is called for creation of various types of components.

The CreateSubClass function which is referenced in the above interface is as follows:

```
(1)  905: function CreateSubClass(AAncestor: TClass; const
          AclassName:
(2)     string;
(3)  906:   const AUnitName: string): TClass;
(4)  907: begin
(5)  908:   Result :=
          TClass(TProxyType.CreateSubType(AAncestor.ClassInfo,
(6)     AClassName, AUnitName));
(7)  909: end;
(8)  910:
(9)  911: resourcestring
(10) 912:   SNoValidConstructor = 'No valid constructor found for %s.';
(11) 913:
```

As shown at line 908, the CreateSubClass method includes a call to a function of the TProxyType class type named CreateSubType.

The TProxyType class type is illustrated below:

```
(1)  77:  TProxyType = class(TypeDelegator)
(2)  78:  strict private
(3)  79:    class var
(4)  80:      FAssemblyBuilder: AssemblyBuilder;
(5)  81:      FModuleBuilder: ModuleBuilder;
(6)  82:      FProxyTypeIndex: Integer;
(7)  83:      FProxyIntercept: TProxyIntercept;
(8)  84:      FRootMetaType: System.Type;
(9)  85:      FRootHandleField: FieldInfo;
(10) 86:      FRootParentField: FieldInfo;
(11) 87:      FProxyNotificationMethod: MethodInfo;
(12) 88:      FSendNotificationMethod: MethodInfo;
(13) 89:      FProxies: Hashtable;
(14) 90:      FInstances: Hashtable;
(15) 91:
(16) 92:    var
(17) 93:      FClassName: string;
(18) 94:      FUnitName: string;
(19) 95:      FMethods: Hashtable;
(20) 96:
(21) 97:  strict protected
(22) 98:    class procedure CreateBoolAttribute(ATypeBuilder:
          TypeBuilder;
(23) 99:      AAttribute: System.Type; AValue: Boolean = True);
(24) 100:   class function CreateMetaSubType(ABaseType, AType:
          System.Type;
(25) 101:     ATypeBuilder: TypeBuilder): System.Type;
(26) 102:   class procedure CodeGenConstructors(ABaseType:
          System.Type;
(27)        ATypeBuilder: TypeBuilder);
(28) 103:   class procedure CodeGenNotification(ABaseType:
          System.Type;
(29)        ATypeBuilder: TypeBuilder);
(30) 104:   class function FindRealType(var AType: System.Type):
          Boolean;
(31) 105:  public
(32) 106:   class constructor Create;
(33) 107:   constructor Create(Ancestor: System.Type; const
          AClassName,
(34)        AUnitName: string);
(35) 108:
(36) 109:   // delegator work
(37) 110:   function get_FullName: string; override;
(38) 111:   function get_Name: string; override;
(39) 112:   function get_Namespace: string; override;
(40) 113:
(41) 114:   // support for the public functions
(42) 115:   class function FindProxy(AInstance: TObject): TProxyType;
(43) 116:   function CreateMethod(const AMethodName: string):
          TMethodCode;
(44) 117:     procedure RenameMethod(const AMethodCode:
          TMethodCode; const
(45)        AMethodName: string);
(46) 118:     procedure DestroyMethod(const AMethodCode:
          TMethodCode);
(47) 119:
(48) 120:   // type versions of the public functions
(49) 121:   class function IsSubTyped(AType: System.Type): Boolean;
(50) 122:   class function CreateSubType(ABaseType: System.Type;
          const
(51)        AClassName: string;
(52) 123:     const AUnitName: string = ''): System.Type;
(53) 124:   class procedure ChangeToProxyType(AType: System.Type);
(54) 125:   class procedure DestroySubType(AType: System.Type);
(55) 126:   class procedure RenameSubType(AType: System.Type;
          const
(56)        AClassName: string;
(57) 127:     const AUnitName: string = '');
(58) 128:
(59) 129:   // support functions for TProxyIntercept
(60) 130:   class function GetMethodAddress(AClass: TClass; const
          AName:
(61)        string; out ACode: TMethodCode): Boolean;
(62) 131:   class function GetMethodProp(AInstance: TObject;
          APropInfo:
(63)        TPropInfo; out AMethod: TMethod): Boolean;
(64) 132:   class function SetMethodProp(AInstance: TObject;
          APropInfo:
(65)        TPropInfo; const AMethod: TMethod): Boolean;
(66) 133:   class function GetUnitName(ATypeInfo: TTypeInfo; out
(67)        AUnitName: string): Boolean;
(68) 134:
(69) 135:     class procedure HandleNotification(Sender: Tobject;
(70)        AComponent: TComponent; Operation: TOperation); static;
(71) 136:
(72) 137:     // onetime snapshot of Proxies' scratch assembly
(73) 138:     // WARNING: once you 'SaveIt'; you can't create anymore
          proxy
(74)        classes/types
(75) 139:     class procedure SaveIt;
(76) 140:   end;
```

As shown, the TProxyType is a .NET TypeDelegator type. The CreateSubType function of the TProxyType class type is as follows:

```
(1)  596: class function TProxyType.CreateSubType(ABaseType:
          System.Type;
(2)  597:   const AClassName: string; const AUnitName: string = ''):
(3)        System.Type;
(4)  598: var
(5)  599:   LTypeBuilder: TypeBuilder;
(6)  600:   LMetaType: System.Type;
(7)  601:   LMetaConstructor: ConstructorInfo;
```

-continued

```
(8)  602:   LProxyType: TProxyType;
(9)  603:   LNewType: System.Type;
(10) 604: begin
(11) 605:   // find the real type . . . if we have been handed a proxytype,
(12)         instead of
(13) 606:   //   a 'realtype', then FindRealType will modify
(14)        ABaseType so that it
(15) 607:   //   points to the proxy's UnderlyingSystemType.
(16) 608:   FindRealType(ABaseType);
(17) 609:
(18) 610:   // create a type builder    . . . remember each type must
              have
(19)        a unique name
(20) 611:   LTypeBuilder :=
              FModuleBuilder.DefineType(Format(STestTypeName,
(21)        [FProxyTypeIndex]), TypeAttributes.Public, ABaseType);
(22) 612:   Inc(FProxyTypeIndex);
(23) 613:
(24) 614:   // find the first ancestor class that has constructors and copy
(25)        them
(26) 615:   CodeGenConstructors(ABaseType, LTypeBuilder);
(27) 616:
(28) 617:   // TODO: If the type is a TComponent desendent then we
              need to
(29)        hook notification
(30) 618:   CodeGenNotification(ABaseType, LTypeBuilder);
(31) 619:
(32) 620:   // quick make the type before it slips away again :-)
(33) 621:   LNewType := LTypeBuilder.CreateType;
(34) 622:   LProxyType := TProxyType.Create(LNewType,
              AClassName, AUnitName);
(35) 623:
(36) 624:   // make up a metaclass for the Delphi System unit
(37) 625:   LMetaType := CreateMetaSubType(ABaseType, LnewType,
(38)        LTypeBuilder);
(39) 626:   LMetaConstructor := LMetaType.GetConstructor([ ]);
(40) 627:   if LMetaConstructor = nil then
(41) 628:     raise EProxyError.Create(SCould NotFindMetaConstructor);
(42) 629:
(43) 630:   // plug ourselves into the class delegator system so that our
(44)        proxy type will
(45) 631:   //   be found when someone does a ClassInfo on this
              type/metatype
(46) 632:   SetClassDelegator(LProxyType,
              LMetaConstructor.Invoke([ ]));
(47) 633:
(48) 634:   // add it to the list of known 'live' proxies
(49) 635:   FProxies.Add(LNewType, LMetaType);
(50) 636:
(51) 637:   // return the proxy type
(52) 638:   Result := LProxyType;
(53) 639: end;
```

If the CreateSubType function has been passed in a proxy type, it proceeds to find the real type as provided at line 608. Recall from the prior discussion that in some cases a proxy of a proxy may be created. If the above function is invoked with a proxy type, the FindRealType function at line 608 modifies the type (i.e., ABaseType) so that it points to the proxy's underlying type system.

The FindRealType function itself is as follows:

```
(1)  586: class function TProxyType.FindRealType(var AType:
            System.Type):
(2)         Boolean;
(3)  587: begin
(4)  588:   // just in case were given a proxy type lets find the real type
(5)  589:   if AType is TProxyType then
(6)  590:     AType := AType.UnderlyingSystemType;
(7)  591:
(8)  592:   // see if we can find it in our list
(9)  593:   Result := FProxies.Contains(AType);
(10) 594: end;
```

As shown above at lines 589-590, if the type that is passed in is a proxy type (TProxyType), then the underlying system type is retrieved. Otherwise, the above-function attempts to find the type in a list of types.

Returning to the above-described CreateSubType function at lines 610-615, the type that is determined is defined via a DefineType function of an FModuleBuilder class as shown in the following portion of the CreateSubType function (which is repeated here for convenience):

```
(1)  610:   // create a type builder    . . . remember each type must
              have
(2)         a unique name
(3)  611:   LTypeBuilder :=
              FModuleBuilder.DefineType(Format(STestTypeName,
(4)         [FProxyTypeIndex]), TypeAttributes.Public, ABaseType);
(5)  612:   Inc(FProxyTypeIndex);
(6)  613:
(7)  614:   // find the first ancestor class that has constructors and copy
(8)         them
(9)  615:   CodeGenConstructors(ABaseType, LTypeBuilder);
```

The module that these types are going to be built into has already been defined. At this point a new type is being defined. Each type needs to have a unique name. It does not really matter what the name is at this point because the type delegator will enable the user to subsequently decide what name to use and rename it on-the-fly. Note that to a person accessing the type through the metadata the type is changing. However, to the .NET runtime environment it is actually some other arbitrary name that has been selected. More particularly, as shown at lines 611-612, the string type is replaced with an index (which is a numeric value, such as 12345).

The next step is to find an ancestor class that has constructors and generate a copy of the constructors for insertion in the proxy class. As shown at line 615, a CodeGenConstructors procedure is called to create the constructors. The CodeGenConstructors procedure is as follows:

```
(1)  468: class procedure TProxyType.CodeGenConstructors(ABaseType:
(2)         System.Type; ATypeBuilder: TypeBuilder);
(3)  469: var
(4)  470:   LConstructors: array of ConstructorInfo;
(5)  471:   LParameters: array of ParameterInfo;
(6)  472:   LParamTypes: array of System.Type;
(7)  473:   LConstructorBaseType: System.Type;
(8)  474:   LConstructorBuilder: ConstructorBuilder;
(9)  475:   LILGenerator: ILGenerator;
(10) 476:   LConstructorNdx, LParameterNdx: Integer;
(11) 477: begin
(12) 478:   LConstructorBaseType := ABaseType;
(13) 479:   while LConstructorBaseType <> nil do
(14) 480:   begin
(15) 481:
(16) 482:     // see if it has any constructors
(17) 483:     LConstructors := LConstructorBaseType.GetConstructors;
(18) 484:     if Length(LConstructors) <> 0 then
(19) 485:     begin
(20) 486:       for LConstructorNdx := Low(LConstructors) to
(21)            High(LConstructors) do
(22) 487:       begin
(23) 488:         with LConstructors[LConstructorNdx] do
(24) 489:         begin
(25) 490:           // copy the param and in turn their types
(26) 491:           LParameters := GetParameters;
(27) 492:           SetLength(LParamTypes, Length(LParameters));
(28) 493:           for LParameterNdx := Low(LParameters) to High
(29)              (LParameters) do
(30) 494:             LParamTypes[LParameterNdx] :=
(31)                LParameters[LParameterNdx].ParameterType;
```

-continued

```
(32) 495:
(33) 496:        // construct a constructor builder
(34) 497:        // LConstructorBuilder :=
(35)   ATypeBuilder.DefineConstructor(Attributes,
(36) 498:           CallingConvention, LParamTypes);
(37) 499:        end;
(38) 500:
(39) 501:        // lets write some code
(40) 502:        LILGenerator := LConstructorBuilder.GetILGenerator;
(41) 503:        with LILGenerator, OpCodes do
(42) 504:        begin
(43) 505:          // CODE TO BE GENERATED
(44) 506:          // inherited Create({arg count depends on parentclass})
(45) 507:
(46) 508:          Emit(Ldarg__0);           //
(47)   push instance
(48) 509:          for LParameterNdx := 1 to Length(LParameters) do
(49) 510:             Emit(Ldarg__S, LParameterNdx);
(50)   // push params
(51) 511:          Emit(Call, LConstructors[LConstructorNdx]);
(52)   // call the base ctr
(53) 512:
(54) 513:          Emit(Ret);
(55)   // fini
(56) 514:        end;
(57) 515:      end;
(58) 516:
(59) 517:      // done
(60) 518:      break;
(61) 519:   end;
(62) 520:
(63) 521:   // move up a level
(64) 522:   LConstructorBaseType := LConstructorBaseType.BaseType;
(65) 523:  end;
(66) 524: end;
```

The above CodeGenConstructors procedure constructs the metadata information and generates the IL code where that information is actually emitted. The metadata information is constructed as illustrated at lines 483-500.

After constructing the metadata information, some code has to be written into the proxy class. As shown commencing above at line 502, an IL generator is obtained to generate code. The code is then emitted to call the ancestor constructor. This is done recursively for the number of constructors that are needed. Once that is done, the function returns the new constructor(s) that have been generated.

Returning back to the CreateSubType function, a CodeGenNotification procedure is called to hook the notification methods of the ancestor class as illustrated in the below portion of the CreateSubType function (which is repeated for convenience):

(1) 617: //TODO: If the type is a TComponent desendent then we need to
(2) hook notification
(3) 618: CodeGenNotification (ABaseType, LtypeBuilder);

As shown, the CodeGenNotification procedure is called at line 618.

The CodeGenNotification procedure that is called in the above portion of the CreateSubType function is as follows:

```
(1)   526: class procedure TProxyType.CodeGenNotification(ABaseType:
(2)     System.Type; ATypeBuilder: TypeBuilder);
(3)   527: var
(4)   528:   LParamTypes: array of System.Type;
(5)   529:   LBaseNotificationMethod: MethodInfo;
(6)   530:   LMethodBuilder: MethodBuilder;
(7)   531:   LILGenerator: ILGenerator;
(8)   532:   LLabel: System.Reflection.Emit.Label;
(9)   533: begin
(10)  534:   // get the param list ready
(11)  535:   SetLength(LParamTypes, 2);
(12)  536:   LParamTypes[0] := TypeOf(Classes.TComponent);
(13)  537:   LParamTypes[1] := TypeOf(Classes.TOperation);
(14)  538:
(15)  539:   // see if we can find a notification method to call
(16)  540:   LBaseNotificationMethod :=
             ABaseType.GetMethod('Notification',
(17)  541:     BindingFlags.Public or BindingFlags.NonPublic or
(18)           BindingFlags.Instance or
(19)  542:     BindingFlags.InvokeMethod, nil, LParamTypes, nil);
(20)  543:   if LBaseNotification Method <> nil then
(21)  544:   begin
(22)  545:
(23)  546:     // create a builder
(24)  547:     with LBaseNotificationMethod do
(25)  548:       LMethod Builder := ATypeBuilder.DefineMethod(Name,
(26)  549:         MethodAttributes.FamORAssem or
                   MethodAttributes.Virtual,
(27)  550:         CallingConvention, ReturnType, LParamTypes);
(28)  551:
(29)  552:     // let's write some code!
(30)  553:     LILGenerator := LMethodBuilder.GetILGenerator;
(31)  554:     with LILGenerator, OpCodes do
(32)  555:     begin
(33)  556:       // CODE TO BE GENERATED
(34)  557:       // Borland.Vcl.Design.Proxies.HandleNotification(Self,
(35)             AComponent, AOperation);
(36)  558:       // if Borland.Vcl.Classes.SendNotification(Self,
                 AComponent,
(37)             AOperation) then
(38)  559:       //   inherited Notification(AComponent, AOperation);
(39)  560:
(40)  561:       Emit(Ldarg__0);           //
(41)   push instance
(42)  562:       Emit(Ldarg__1);           // push
(43)   component reference
(44)  563:       Emit(Ldarg__2);           // push what is
(45)   happening to it
(46)  564:       Emit(Call, FProxyNotificationMethod);   // call the
(47)   proxy's notify-wedge
(48)  565:
(49)  566:       Emit(Ldarg__0);           //
(50)   push instance
(51)  567:       Emit(Ldarg__1);           // push
(52)   component reference
(53)  568:       Emit(Ldarg__2);           // push what is
(54)   happening to it
(55)  569:       Emit(Call, FSendNotificationMethod);   // call classes'
(56)   sendnotification
(57)  570:
(58)  571:       LLabel := DefineLabel;
(59)  572:       Emit(Brfalse__S, LLabel);    // if result is
(60)   false then . . .
(61)  573:
(62)  574:       Emit(Ldarg__0);           //
(63)   push instance
(64)  575:       Emit(Ldarg__1);           // push
(65)   component reference
(66)  576:       Emit(Ldarg__2);           // push what is
(67)   happening to it
(68)  577:       Emit(Call, LBaseNotificationMethod);   // call the
(69)   base's method
(70)  578:
(71)  579:       MarkLabel(LLabel);        //
(72)   ..jump to here
(73)  580:
(74)  581:       Emit(Ret);
(75)   // fini
(76)  582:     end;
(77)  583:   end;
(78)  584: end;
```

The above routine is a little more complicated because it actually has to emit a call to another method. In other words, the above procedure has to make a "side-band" call to generate the metadata information for the method that is being overridden. The comment commencing at line 557 is essentially the code that is being generated as a result. What this does is override the notification method to call a send notification event method. The above routine generates IL code on-the-fly so that the execution environment will then see this code and translate it back to machine code at runtime (or whenever it is encountered which could be at design-time rather than at runtime) to provide for hooking the notification method of the ancestor.

After generating the IL code, the CreateSubType function continues with creating the proxy type as illustrated in the portion of the function commencing at line 620 (which is repeated below):

```
620:  // quick make the type before it slips away again :-)
621:  LNewType := LTypeBuilder.CreateType;
622:  LProxyType := TProxyType.Create(LNewType, AClassName,
         AUnitName);
623:
624:  // make up a metaclass for the Delphi System unit
625:  LMetaType := CreateMetaSubType(ABaseType, LnewType,
    LTypeBuilder);
626:  LMetaConstructor := LMetaType.GetConstructor([ ]);
627:  if LMetaConstructor = nil then
628:     raise EProxyError.Create(SCouldNotFindMetaConstructor);
629:
630:  // plug ourselves into the class delegator system so that our
   proxy type will
631:  // be found when someone does a ClassInfo on this
       type/metatype
632:  SetClassDelegator(LProxyType,
       LMetaConstructor.Invoke([ ]));
633:
634:  // add it to the list of known 'live' proxies
635:  FProxies.Add(LNewType, LMetaType);
636:
637:  // return the proxy type
638:  Result := LProxyType;
639: end;
```

The type that is created is the actual proxy type. The actual proxy type is what the CreateSubType function ends up returning.

Before going in and setting the class delegator a metaclass is created. Metaclass information is generated that mimics what the compiler has generated for the ancestor. The metaclass information is extra information that the compiler generates when it is compiling (normal) code in order to allow certain language constructs. A similar process is performed here to allow those language constructs.

The class delegator is actually set though a call to SetClassDelegator at line 632. The present invention provides for dynamically constructing the proxy class and then setting the class delegator onto the class. As a result, whenever the metadata information is requested, the delegator is obtained instead. This provides access to the metadata information that can be hooked for implementing the methodology of the present invention.

At line 635 the proxy class that has been created is added to a list of known, "live" proxies that is maintained by the system. This enables the system to keep track of proxies that have been created. At line 638, the proxy type that has been constructed is returned. As previously mentioned, for all intents and purposes to the rest of the system this proxy type is a real .NET runtime type. However, because of the type delegator, it operates in a manner similar to a proxy.

After the proxy class is constructed as described above, an instance of the class is created. The instance that is created is an instance of that particular type and appears as an instance of that type in the .NET execution environment. The proxy class provides for the form to be visible in the user interface and enables it to be persisted and written out so that the design state of the component is maintained.

When the user wants to create a new component (e.g., drop a button onto the form created as described above), the system similarly constructs a "real" instance of the component. Assume, for example, that a developer drops a button component (e.g., "Button 1") on the visual design surface (i.e., on the form). The developer then proceeds to create a method (e.g., a "Button1 Click" method) to handle the event (e.g., an application end user clicking on Button1).

Internally, when a method is created the IDE in which the present invention is embodied performs a validation and informs the code manager that a method will be generated. The code manager is given the method name and information about the method (e.g., a list of parameters). The code manager ensures that there is not a method that already has that name. The code for the method is then created (e.g., written by the developer or generated by the IDE).

After the code for the method is created, a CreateMethod function is called. The TProxyType.CreateMethod function which is called is as follows:

```
704: function TProxyType.CreateMethod(const AMethodName:
        string):
     TMethodCode;
705: var
706:   LMethodCode: TMethodCode;
707: begin
708:   LMethodCode := TMethodProxy(FMethods[AMethodName]);
709:   if LMethodCode = nil then
710:   begin
711:     LMethodCode := TMethodProxy.Create(Self,
          AMethodName);
712:     FMethods.Add(AMethodName, LMethodCode);
713:   end;
714:   Result := LMethodCode;
715: end;
```

The type delegator is applicable in this case. Because of the existence of the type delegator (which serves as a "shim"), a list of the methods on the actual proxy type that has been constructed is available. In this respect the type delegator serves as a proxy and provides access to the list of methods. In the currently preferred embodiment, the list of methods is based on the method name as there is only one method of a given name on a given class.

The type delegator finds the method name and essentially returns the "cookie" (as described earlier in this document) for that method. The proxy thereby has information that there is a certain method name associated with this class type. The method is not tied to a particular field (e.g., the Button1 object), but rather is tied to the actual class type that is being designed, which is the proxy class representing the form (i.e., the button references a method on its container).

The system of the present invention, in its currently preferred embodiment, also includes a RenameMethod function, a DestroyMethod function, and a GetMethodAddress function as follows:

```
717: procedure TProxyType.RenameMethod(const AMethodCode:
       TMethodCode;
```

-continued

```
 (2)    const AMethodName: string);
 (3)  718: begin
 (4)  719:   // make sure it is a method proxy
 (5)  720:   if not (AMethodCode is TMethodProxy) then
 (6)  721:     raise EProxyError.Create(SMethodNotMethodProxy);
 (7)  722:
 (8)  723:   // remove, rename and re-add
 (9)  724:   FMethods.Remove(AMethodCode.Name);
(10)  725:   TMethodProxy(AMethodCode).Rename(AMethodName);
(11)  726:   FMethods.Add(AMethodName, AMethodCode);
(12)  727: end;
(13)  728:
(14)  729: procedure TProxyType.DestroyMethod(const
           AMethodCode: TMethodCode);
(15)  730: begin
(16)  731:   // make sure it is a method proxy
(17)  732:   if not (AMethodCode is TMethodProxy) then
(18)  733:     raise EProxyError.Create(SMethodNotMethodProxy);
(19)  734:
(20)  735:   // remove and clear
(21)  736:   FMethods.Remove(AMethodCode.Name);
(22)  737:   TMethodProxy(AMethodCode).Clear;
(23)  738: end;
(24)  739:
(25)  740: class function TProxyType.GetMethodAddress(AClass: TClass;
           const
(26)    AName: string; out ACode: TMethodCode): Boolean;
(27)  741: var
(28)  742:   LType: System.Type;
(29)  743: begin
(30)  744:   // assume failure
(31)  745:   ACode := nil;
(32)  746:
(33)  747:   // find the class' type
(34)  748:   LType := AClass.ClassInfo;
(35)  749:   Result := LType is TProxyType;
(36)  750:
(37)  751:   // keep looking but only if the type is a TProxyType
(38)  752:   while LType is TProxyType do
(39)  753:   begin
(40)  754:
(41)  755:     // see if there is a method
(42)  756:     ACode :=
           TMethodCode(TProxyType(LType).FMethods.Item[AName]);
(43)  757:     if ACode <> nil then
(44)  758:       break;
(45)  759:
(46)  760:     // still nothing? then look at the parent class
(47)  761:     AClass := AClass.ClassParent;
(48)  762:     LType := AClass.ClassInfo;
(49)  763:   end;
(50)  764: end;
```

The CreateMethod, RenameMethod, and DestroyMethod functions illustrated above are the basic functions that enable a method to be created, renamed, and destroyed. For instance, if a developer renames a method (e.g., from "Button1 Click" to "ButtonSelect"), the corresponding metadata also has to be renamed so that the streaming system can continue to find it. Otherwise, the streaming system might look for a method with a given name and not find it, which would cause an error. If all references to a function are deleted or if the method is removed from the application, the DestroyMethod function is used to pull it back out so that it does not exist anymore. The GetMethodAddress function returns the address of the method (i.e., indicates where the method exists) given a particular method name.

Modification of an Existing Form

The same general process is involved if the user wants to modify a form that has previously been created. For example, the user may complete a design session for a form (e.g., TForm1) and persist the form out through the streaming system. Subsequently, he or she may decide to add a new button to the form. When the persisted information is loaded back into system memory, the system still goes through the above process in order to construct the proxy that represents the form internally in the system. Even though technically that proxy has previously been created, it has to be recreated dynamically based on the information coming in from the persisted data (file). The same components initially created are again created during this reconstruction process. The proxy class is created as a subclass of an ancestor class. Additional information that is streamed in indicates that the form has certain components (e.g., Button1) and related methods (e.g., the Button1 Click method). The reconstructed proxy enables the user to continue to design the form where he or she left off.

The user may then proceed to make modifications to the form. For instance, he or she may add a second button to the form and then save (i.e., persist out) the modified form with two buttons. The system of the present invention operates in a symmetrical fashion. When persisted information (e.g., regarding a particular form) is streamed in, the proxy is recreated as if it were new. The modified version is then streamed back out with whatever changes that were made so that the modified version is persisted. This process can be repeated a number of times until the design of the form(s) and the application in which the form(s) is included is completed.

Descendants of a form that has been created may also be constructed in a similar fashion. The same process as described above will occur, but when looking up methods, one will actually see the ancestor's methods in the type information. For example, a developer may create a descendant of TForm1 that already includes one button. He or she can add a new button on the descendant form and have it call the ancestor's click method when it is invoked. The button on the new form can be bound to the ancestor's click method because it is visible to the descendant form.

Alternatively, the user can take the ancestor's button and assign it to a new method on the descendant form. The method on the descendant form would override the method of the ancestor in that case. It should be noted that this is not a virtual override in the sense that it is not a standard object-oriented programming (OOP) style override. Rather, it is a delegation override as Delphi, for the most part, operates on more of a delegation model rather than a pure inheritance model. One can actually assign an event that is a reference to an instance and to a method (which is what an event handler is). In contrast to normal inheritance provided by OOP languages (e.g., Java), this involves binding to a static method on a class. The delegation model involves delegating the behavior of the button click to some other object, but the button has no knowledge of the other object. All the object knows is that it can call a method on a class with certain parameters. As long as that class instance has a method that matches that signature, they can be bound together and the button can call the method.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. In a form-based development system, a method for dynamically constructing a form under an object framework during development of an application by a user, the method comprising:

providing an ancestor class under the object framework, the ancestor class for representing a form in the development system;

in response to user input, creating a descendant class inheriting from the ancestor class for representing a particular form to be included in the application without directly manipulating metadata of the ancestor class;

generating intermediate language instructions for creating methods of the descendant class under the object framework;

creating a type delegator for the descendant class, the type delegator being configured to persist information associated with the particular form and to intercept the metadata using a metadata application programming interface call, the metadata being manipulated to change a class type associated with the type delegator dynamically and to create a data structure to track changes to be instantiated with the particular form and the descendant class being configured to act as a proxy configured to represent the particular form, thereby enabling the descendant class to track changes made to the particular form during development of the application;

creating an instance of the descendant class;

constructing the particular form in the development system based on the instance of the descendant class and making a design time representation of the particular form visible to the user without using source code and without compiling the descendant class;

tracking changes to the particular form made during development of the application using the type delegator, the type delegator being configured to persist the information to the descendent class without changing the particular form during development of the application prior to runtime; and subsequently, generating a version of the particular form at runtime based on persisted information.

2. The method of claim 1, wherein the object framework comprises an infrastructure for building, deploying and running applications having a common language runtime.

3. The method of claim 1, wherein said creating step includes creating the descendant class configured to represent the particular form in a user interface of the development system.

4. The method of claim 1, wherein said creating step includes inheriting a set of components provided by the ancestor class for representing components that may placed on the particular form.

5. The method of claim 1, wherein said creating step includes creating an assembly for the descendant class.

6. The method of claim 1, further comprising:
creating another descendant class which inherits from the descendant class, the created another descendant class for representing a form which inherits from the particular form.

7. The method of claim 1, wherein said constructing step includes constructing the particular form based upon the descendant class in a user interface of the development system.

8. The method of claim 1, wherein said constructing step includes displaying a component palette including components which the user can select for placement on the particular form.

9. The method of claim 8, further comprising:
receiving user input for placing components selected from the palette on the particular form.

10. The method of claim 9, wherein the type delegator tracks creation of components on the particular form in response to a user placing a component on the particular form.

11. The method of claim 9, wherein the type delegator persists information regarding components placed on the particular form, enabling the components placed on the particular form to be recreated at runtime.

12. The method of claim 1, wherein said generating step includes generating a constructor for the descendant class.

13. The method of claim 12, wherein said step of generating a constructor includes generating intermediate language instructions for building the constructor.

14. The method of claim 13, wherein said step of generating intermediate language instructions includes using classes provided by the object framework for generating intermediate language instructions.

15. The method of claim 13, wherein said generating step includes generating instructions for calling the constructor of the ancestor class, thereby ensuring execution of an appropriate constructor implemented by the ancestor class.

16. The method of claim 1, wherein said generating step includes generating methods for overriding notification methods of the ancestor class.

17. The method of claim 16, wherein said generating step includes generating intermediate language instructions for overriding notification methods of the ancestor class.

18. The method of claim 1, wherein the type delegator provides information for enumerating fields, methods, properties, and events in response to user input on the particular form in the development system.

19. The method of claim 1, wherein the type delegator generates the metadata in response to user input on the particular form.

20. The method of claim 19, wherein said step of generating the metadata includes adding a reference to methods of the application assigned to components on the particular form.

21. The method of claim 1, further comprising:
persisting a state of the particular form, enabling the particular form to be recreated at runtime.

22. The method of claim 21, wherein said persisting step includes persisting user input on the particular form.

23. A computer-readable medium having processor-executable instructions for performing the method of claim 1.

24. A downloadable set of processor-executable instructions for performing the method of claim 1.

25. A development system for dynamically constructing a form responsive to user input under an object framework during development of an application, the system comprising:
a computer having a processor and memory;
an ancestor class for representing the form under the object framework;
a proxy module for creating a descendant class inheriting from the ancestor class in response to user input, dynamically generating methods of the descendant class, and constructing an instance as a particular form of the descendant class under the object framework for representing the form in the development system;
a type delegator for the descendant class for tracking user input on the particular form during development of the application, the type delegator being configured to persist information associated with the particular form and to intercept metadata using a metadata application programming interface call, the metadata being manipulated to change a class type associated with the type delegator dynamically and to create a data structure to track one or more changes to be instantiated with the particular form and the descendant class being configured to act as a proxy configured to represent the particular form, enabling the descendant class to track the one or more changes made to the particular form during development of the application;

a persistence mechanism for persisting user input on the particular form and configured to persist the information from the type delegator to the particular form without changing the particular form during development of the application prior to runtime; and a module for displaying a design time representation of the particular form in a user interface of the development system based on the descendant class and the persisted user input without using source code and without compiling the descendant class and subsequently generating a version of the particular form at the runtime based on the persisted information.

26. The system of claim 25, wherein the object framework comprises an infrastructure for building, deploying and running applications having a common language runtime.

27. The system of claim 25, wherein the proxy module creates an assembly for the descendant class.

28. The system of claim 25, wherein the proxy module creates a descendant class for representing the particular form in a user interface of the development system.

29. The system of claim 28, wherein the descendant class inherits a set of components provided by the ancestor class for representing components that may placed on the particular form.

30. The system of claim 28, wherein the proxy module creates a second descendant class which inherits from the descendant class, the created second descendant class for representing a second form which inherits from the particular form previously created in the development system.

31. The system of claim 28, wherein the particular form includes a component palette comprising components which the user can select.

32. The system of claim 31, wherein the type delegator persists user input for placing components selected from the palette on the particular form.

33. The system of claim 32, wherein the type delegator persists information regarding components placed on the particular form, enabling components to be recreated at runtime.

34. The system of claim 25, wherein the proxy module generates a constructor for the descendant class.

35. The system of claim 34, wherein the proxy module generates intermediate language instructions for building the constructor.

36. The system of claim 35, wherein the proxy module generates intermediate language instructions using classes for generating intermediate language instructions provided by the object framework.

37. The system of claim 35, wherein the proxy module generates instructions for calling the constructor of the ancestor class, thereby ensuring execution of an appropriate constructor implemented by the ancestor class.

38. The system of claim 25, wherein the proxy module generates methods for overriding notification methods of the ancestor class.

39. The system of claim 38, wherein the proxy module generates intermediate language instructions for overriding notification methods of the ancestor class.

40. The system of claim 39, wherein the proxy module generates intermediate language instructions using classes for generating intermediate language instructions provided by the object framework.

41. The system of claim 25, wherein the information is used to enumerate fields, systems, properties, and events in response to user input on the particular form during development of the application.

42. The system of claim 25, wherein the type delegator generates the metadata in response to user input on the particular form.

43. The system of claim 42, wherein said metadata includes a reference to methods of the application assigned to particular components on the particular form.

44. The system of claim 43, wherein said metadata and the descendant class are used to reconstruct the particular form as part of the application at runtime.

45. The system of claim 25, wherein the particular form comprises another form open on a visual design surface of the development system.

46. The system of claim 25, wherein the persisting mechanism persists state of the particular form.

47. The system of claim 46, wherein the persisting mechanism enables the particular form to be recreated at runtime as part of the application.

* * * * *